(12) United States Patent
Solis

(10) Patent No.: US 9,978,025 B2
(45) Date of Patent: May 22, 2018

(54) ORDERED-ELEMENT NAMING FOR NAME-BASED PACKET FORWARDING

(71) Applicant: CISCO TECHNOLOGY, INC., San Jose, CA (US)

(72) Inventor: Ignacio Solis, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 796 days.

(21) Appl. No.: 13/847,814

(22) Filed: Mar. 20, 2013

(65) Prior Publication Data

US 2014/0289325 A1    Sep. 25, 2014

(51) Int. Cl.
*G06F 15/16* (2006.01)
*G06Q 10/06* (2012.01)
*H04L 29/08* (2006.01)
*H04L 12/743* (2013.01)

(52) U.S. Cl.
CPC ......... *G06Q 10/06* (2013.01); *H04L 45/7457* (2013.01); *H04L 67/327* (2013.01)

(58) Field of Classification Search
CPC ... H04L 45/00; H04L 45/7457; H04L 67/327; H04L 45/748; H04L 29/12066; H04L 45/12; H04L 45/54; H04L 45/70; H04L 61/1511; H04L 69/22; G06Q 10/06
See application file for complete search history.

(56) References Cited

U.S. PATENT DOCUMENTS

| | | |
|---|---|---|
| 817,441 A | 4/1906 | Niesz |
| 4,309,569 A | 1/1982 | Merkle |
| 4,921,898 A | 5/1990 | Lenney |
| 5,070,134 A | 12/1991 | Oyamada |
| 5,110,856 A | 5/1992 | Oyamada |

(Continued)

FOREIGN PATENT DOCUMENTS

| | | |
|---|---|---|
| DE | 1720277 A1 | 6/1967 |
| DE | 19620817 A1 | 11/1997 |

(Continued)

OTHER PUBLICATIONS

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).*

(Continued)

*Primary Examiner* — Jason D Recek

(57) ABSTRACT

A name-based content-forwarding system generates an ordered-element name for a content item, and can process an interest to identify and perform an action that satisfies the interest. To generate the ordered-element name, the system generates one or more fixed-length elements for a content item, such that each fixed-length element of the ordered-element name is mapped to the content item or to a context associated with the content item. The system then generates the ordered-element name to include the one or more fixed-length elements so that the name elements are ordered from a highest matching priority to a lowest matching priority. The system can also generate a packet that includes the ordered-element name for the content item, and sends the packet to a target location that corresponds to the ordered-element name.

23 Claims, 10 Drawing Sheets

(56) References Cited

U.S. PATENT DOCUMENTS

| | | |
|---|---|---|
| 5,506,844 A | 4/1996 | Rao |
| 5,629,370 A | 5/1997 | Freidzon |
| 5,870,605 A | 2/1999 | Bracho |
| 6,052,683 A | 4/2000 | Irwin |
| 6,091,724 A | 7/2000 | Chandra |
| 6,173,364 B1 | 1/2001 | Zenchelsky |
| 6,226,618 B1 | 5/2001 | Downs |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,543,064 B2 | 6/2009 | Juncker |
| 7,552,233 B2 | 6/2009 | Raju |
| 7,555,563 B2 | 6/2009 | Ott |
| 7,567,547 B2 | 7/2009 | Mosko |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,862,774 B2 | 10/2014 | Vasseur |
| 8,937,865 B1 | 1/2015 | Kumar |
| 9,071,498 B2 | 6/2015 | Beser |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Paterka |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0221047 A1 | 11/2004 | Grover |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1* | 4/2005 | Mattes et al. ............... 370/389 |
| 2005/0149508 A1 | 7/2005 | Deshpande |
| 2005/0159823 A1 | 7/2005 | Hayes |
| 2005/0198351 A1* | 9/2005 | Nog et al. .................. 709/232 |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2008/0005056 A1 | 1/2008 | Stelzig |
| 2008/0010366 A1* | 1/2008 | Duggan .................... 709/223 |
| 2008/0037420 A1 | 2/2008 | Tang |
| 2008/0043989 A1 | 2/2008 | Furutono |

(56) References Cited

U.S. PATENT DOCUMENTS

| Publication No. | Date | Name | Ref |
|---|---|---|---|
| 2008/0046340 A1 | 2/2008 | Brown | |
| 2008/0059631 A1 | 3/2008 | Bergstrom | |
| 2008/0080440 A1 | 4/2008 | Yarvis | |
| 2008/0101357 A1 | 5/2008 | Iovanna | |
| 2008/0107034 A1 | 5/2008 | Jetcheva | |
| 2008/0123862 A1 | 5/2008 | Rowley | |
| 2008/0133583 A1 | 6/2008 | Artan | |
| 2008/0133755 A1 | 6/2008 | Pollack | |
| 2008/0151755 A1 | 6/2008 | Nishioka | |
| 2008/0159271 A1 | 7/2008 | Kutt | |
| 2008/0186901 A1 | 8/2008 | Itagaki | |
| 2008/0200153 A1 | 8/2008 | Fitzpatrick | |
| 2008/0215669 A1 | 9/2008 | Gaddy | |
| 2008/0216086 A1 | 9/2008 | Tanaka | |
| 2008/0243992 A1 | 10/2008 | Jardetzky | |
| 2008/0256359 A1 | 10/2008 | Kahn | |
| 2008/0270618 A1 | 10/2008 | Rosenberg | |
| 2008/0287142 A1 | 11/2008 | Keighran | |
| 2008/0288580 A1 | 11/2008 | Wang | |
| 2008/0320148 A1 | 12/2008 | Capuozzo | |
| 2009/0013324 A1 | 1/2009 | Gobara | |
| 2009/0022154 A1 | 1/2009 | Kiribe | |
| 2009/0024641 A1 | 1/2009 | Quigley | |
| 2009/0030978 A1 | 1/2009 | Johnson | |
| 2009/0037763 A1 | 2/2009 | Adhya | |
| 2009/0052660 A1 | 2/2009 | Chen | |
| 2009/0067429 A1 | 3/2009 | Nagai | |
| 2009/0077184 A1 | 3/2009 | Brewer | |
| 2009/0092043 A1 | 4/2009 | Lapuh | |
| 2009/0097631 A1 | 4/2009 | Gisby | |
| 2009/0103515 A1 | 4/2009 | Pointer | |
| 2009/0113068 A1 | 4/2009 | Fujihira | |
| 2009/0144300 A1 | 6/2009 | Chatley | |
| 2009/0157887 A1 | 6/2009 | Froment | |
| 2009/0185745 A1 | 7/2009 | Momosaki | |
| 2009/0193101 A1 | 7/2009 | Munetsugu | |
| 2009/0222344 A1 | 9/2009 | Greene | |
| 2009/0228593 A1 | 9/2009 | Takeda | |
| 2009/0254572 A1 | 10/2009 | Redlich | |
| 2009/0268905 A1 | 10/2009 | Matsushima | |
| 2009/0285209 A1 | 11/2009 | Stewart | |
| 2009/0287835 A1* | 11/2009 | Jacobson | 709/229 |
| 2009/0288163 A1* | 11/2009 | Jacobson et al. | 726/22 |
| 2009/0300079 A1 | 12/2009 | Shitomi | |
| 2009/0300407 A1 | 12/2009 | Kamath | |
| 2009/0307333 A1 | 12/2009 | Welingkar | |
| 2009/0323632 A1 | 12/2009 | Nix | |
| 2010/0005061 A1 | 1/2010 | Basco | |
| 2010/0027539 A1 | 2/2010 | Beverly | |
| 2010/0046546 A1 | 2/2010 | Ram | |
| 2010/0057929 A1 | 3/2010 | Merat | |
| 2010/0088370 A1 | 4/2010 | Wu | |
| 2010/0098093 A1 | 4/2010 | Ejzak | |
| 2010/0100465 A1 | 4/2010 | Cooke | |
| 2010/0103870 A1 | 4/2010 | Garcia-Luna-Aceves | |
| 2010/0124191 A1 | 5/2010 | Vos | |
| 2010/0131660 A1 | 5/2010 | Dec | |
| 2010/0150155 A1 | 6/2010 | Napierala | |
| 2010/0165976 A1 | 7/2010 | Khan | |
| 2010/0169478 A1 | 7/2010 | Saha | |
| 2010/0169503 A1* | 7/2010 | Kollmansberger et al. | 709/231 |
| 2010/0180332 A1 | 7/2010 | Ben-Yochanan | |
| 2010/0182995 A1 | 7/2010 | Hwang | |
| 2010/0185753 A1 | 7/2010 | Liu | |
| 2010/0195653 A1 | 8/2010 | Jacobson | |
| 2010/0195654 A1* | 8/2010 | Jacobson et al. | 370/392 |
| 2010/0195655 A1* | 8/2010 | Jacobson et al. | 370/392 |
| 2010/0217874 A1 | 8/2010 | Anantharaman | |
| 2010/0232402 A1 | 9/2010 | Przybysz | |
| 2010/0232439 A1 | 9/2010 | Dham | |
| 2010/0235516 A1 | 9/2010 | Nakamura | |
| 2010/0246549 A1 | 9/2010 | Zhang | |
| 2010/0250497 A1 | 9/2010 | Redlich | |
| 2010/0250939 A1 | 9/2010 | Adams | |
| 2010/0268782 A1 | 10/2010 | Zombek | |
| 2010/0272107 A1 | 10/2010 | Papp | |
| 2010/0284309 A1 | 11/2010 | Allan | |
| 2010/0284404 A1 | 11/2010 | Gopinath | |
| 2010/0293293 A1 | 11/2010 | Beser | |
| 2010/0322249 A1 | 12/2010 | Thathapudi | |
| 2011/0013637 A1 | 1/2011 | Xue | |
| 2011/0022812 A1 | 1/2011 | vanderLinden | |
| 2011/0055392 A1 | 3/2011 | Shen | |
| 2011/0055921 A1 | 3/2011 | Narayanaswamy | |
| 2011/0090908 A1* | 4/2011 | Jacobson et al. | 370/392 |
| 2011/0106755 A1 | 5/2011 | Hao | |
| 2011/0145597 A1 | 6/2011 | Yamaguchi | |
| 2011/0145858 A1 | 6/2011 | Philpott | |
| 2011/0153840 A1 | 6/2011 | Narayana | |
| 2011/0161408 A1* | 6/2011 | Kim et al. | 709/203 |
| 2011/0202609 A1 | 8/2011 | Chaturvedi | |
| 2011/0231578 A1 | 9/2011 | Nagappan | |
| 2011/0239256 A1 | 9/2011 | Gholmieh | |
| 2011/0258049 A1 | 10/2011 | Ramer | |
| 2011/0264824 A1 | 10/2011 | Venkata Subramanian | |
| 2011/0265174 A1 | 10/2011 | Thornton | |
| 2011/0271007 A1 | 11/2011 | Wang | |
| 2011/0286457 A1* | 11/2011 | Ee et al. | 370/392 |
| 2011/0286459 A1 | 11/2011 | Rembarz | |
| 2011/0299454 A1 | 12/2011 | Krishnaswamy | |
| 2012/0011170 A1 | 1/2012 | Elad | |
| 2012/0011551 A1 | 1/2012 | Levy | |
| 2012/0036180 A1* | 2/2012 | Thornton et al. | 709/203 |
| 2012/0066727 A1 | 3/2012 | Nozoe | |
| 2012/0106339 A1 | 5/2012 | Mishra | |
| 2012/0114313 A1 | 5/2012 | Phillips | |
| 2012/0120803 A1 | 5/2012 | Farkas | |
| 2012/0136936 A1 | 5/2012 | Quintuna | |
| 2012/0136945 A1 | 5/2012 | Lee | |
| 2012/0141093 A1 | 6/2012 | Yamaguchi | |
| 2012/0155464 A1* | 6/2012 | Kim et al. | 370/390 |
| 2012/0158973 A1* | 6/2012 | Jacobson et al. | 709/227 |
| 2012/0163373 A1 | 6/2012 | Lo | |
| 2012/0179653 A1 | 7/2012 | Araki | |
| 2012/0197690 A1 | 8/2012 | Agulnek | |
| 2012/0198048 A1 | 8/2012 | Ioffe | |
| 2012/0221150 A1 | 8/2012 | Arensmeier | |
| 2012/0224487 A1 | 9/2012 | Hui | |
| 2012/0257500 A1 | 10/2012 | Lynch | |
| 2012/0290669 A1 | 11/2012 | Parks | |
| 2012/0290919 A1 | 11/2012 | Melnyk | |
| 2012/0291102 A1 | 11/2012 | Cohen | |
| 2012/0314580 A1 | 12/2012 | Hong | |
| 2012/0317307 A1 | 12/2012 | Ravindran | |
| 2012/0331112 A1 | 12/2012 | Chatani | |
| 2013/0041982 A1 | 2/2013 | Shi | |
| 2013/0051392 A1* | 2/2013 | Filsfils et al. | 370/392 |
| 2013/0060962 A1* | 3/2013 | Wang et al. | 709/238 |
| 2013/0073552 A1 | 3/2013 | Rangwala | |
| 2013/0074155 A1 | 3/2013 | Huh | |
| 2013/0110987 A1 | 5/2013 | Kim | |
| 2013/0111063 A1 | 5/2013 | Lee | |
| 2013/0151584 A1 | 6/2013 | Westphal | |
| 2013/0163426 A1* | 6/2013 | Beliveau et al. | 370/235 |
| 2013/0166668 A1 | 6/2013 | Byun | |
| 2013/0173822 A1* | 7/2013 | Hong et al. | 709/232 |
| 2013/0182856 A1* | 7/2013 | Lee et al. | 370/231 |
| 2013/0185406 A1 | 7/2013 | Choi | |
| 2013/0197698 A1 | 8/2013 | Shah | |
| 2013/0219038 A1 | 8/2013 | Lee | |
| 2013/0219081 A1* | 8/2013 | Qian et al. | 709/241 |
| 2013/0219478 A1 | 8/2013 | Mahamuni | |
| 2013/0223237 A1 | 8/2013 | Hui | |
| 2013/0227166 A1 | 8/2013 | Ravindran | |
| 2013/0242996 A1 | 9/2013 | Varvello | |
| 2013/0250809 A1 | 9/2013 | Hui | |
| 2013/0282854 A1 | 10/2013 | Jang | |
| 2013/0282860 A1 | 10/2013 | Zhang | |
| 2013/0282920 A1 | 10/2013 | Zhang | |
| 2013/0304937 A1 | 11/2013 | Lee | |
| 2013/0329696 A1 | 12/2013 | Xu | |
| 2013/0336323 A1 | 12/2013 | Srinivasan | |
| 2013/0343408 A1 | 12/2013 | Cook | |
| 2014/0003232 A1 | 1/2014 | Guichard | |

(56) References Cited

U.S. PATENT DOCUMENTS

| | | | |
|---|---|---|---|
| 2014/0006565 A1 | 1/2014 | Muscariello | |
| 2014/0029445 A1 | 1/2014 | Hui | |
| 2014/0032714 A1 | 1/2014 | Liu | |
| 2014/0040505 A1 | 2/2014 | Barton | |
| 2014/0074730 A1 | 3/2014 | Arensmeier | |
| 2014/0075567 A1 | 3/2014 | Raleigh | |
| 2014/0082135 A1 | 3/2014 | Jung | |
| 2014/0089454 A1 | 3/2014 | Jeon | |
| 2014/0129736 A1 | 5/2014 | Yu | |
| 2014/0136814 A1 | 5/2014 | Stark | |
| 2014/0140348 A1 | 5/2014 | Perlman | |
| 2014/0143370 A1 | 5/2014 | Vilenski | |
| 2014/0146819 A1 | 5/2014 | Bae | |
| 2014/0149733 A1 | 5/2014 | Kim | |
| 2014/0156396 A1 | 6/2014 | deKozan | |
| 2014/0172783 A1 | 6/2014 | Suzuki | |
| 2014/0172981 A1* | 6/2014 | Kim et al. | 709/204 |
| 2014/0173034 A1 | 6/2014 | Liu | |
| 2014/0192717 A1 | 7/2014 | Liu | |
| 2014/0195328 A1* | 7/2014 | Ferens et al. | 705/14.41 |
| 2014/0195666 A1 | 7/2014 | Dumitriu | |
| 2014/0233575 A1 | 8/2014 | Xie | |
| 2014/0237085 A1 | 8/2014 | Park | |
| 2014/0280823 A1* | 9/2014 | Varvello et al. | 709/223 |
| 2014/0281489 A1 | 9/2014 | Peterka | |
| 2014/0281505 A1 | 9/2014 | Zhang | |
| 2014/0282816 A1 | 9/2014 | Xie | |
| 2014/0289325 A1 | 9/2014 | Solis | |
| 2014/0289790 A1 | 9/2014 | Wilson | |
| 2014/0314093 A1 | 10/2014 | You | |
| 2014/0365550 A1 | 12/2014 | Jang | |
| 2015/0006896 A1 | 1/2015 | Franck | |
| 2015/0018770 A1 | 1/2015 | Baran | |
| 2015/0032892 A1 | 1/2015 | Narayanan | |
| 2015/0063802 A1 | 3/2015 | Bahadur | |
| 2015/0095481 A1 | 4/2015 | Ohnishi | |
| 2015/0095514 A1 | 4/2015 | Yu | |
| 2015/0188770 A1 | 7/2015 | Naiksatam | |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
Detti et al., "Supporting the Web with an information centric network that routes by name", Aug. 2012, Computer Networks 56, pp. 3705-3702.
Garcia-Luna-Aceves et al., "Automatic Routing Using Multiple Prefix Labels", 2012, IEEE, Ad Hoc and Sensor Networking Symposium.
Hoque et al., 'NLSR: Named-data Link State Routing Protocol', Aug. 12, 2013, ICN 2013, pp. 15-20.
lshiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
L. Wang et al., 'OSPFN: An OSPF Based Routing Protocol for Named Data Networking,' Technical Report NDN-0003, 2012.
Merindol et al., "An efficient algorithm to enable path diversity in link state routing networks", Jan. 10, Computer Networks 55 (2011), pp. 1132-1140.
Soh et al., "Efficient Prefix Updates for IP Router Using Lexicographic Ordering and Updateable Address Set", Jan. 2008, IEEE Transactions on Computers, vol. 57, No. 1.
V. Jacobson et al., 'Networking Named Content,' Proc. IEEE CoNEXT '09, Dec. 2009.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking (Feb. 2009).
B. Lynn$2E.
C. Gentry and A. Silverberg. Hierarchical ID-Based Cryptography. Advances in Cryptology—ASIACRYPT 2002. Springer Berlin Heidelberg (2002).
D. Boneh, C. Gentry, and B. Waters, Collusi.
D. Boneh and M. Franklin. Identity-Based Encryption from the Weil Pairing. Advances in Cryptology—CRYPTO 2001, vol. 2139, Springer Berlin Heidelberg (2001).
G. Ateniese, K. Fu, M. Green, and S. Hohenberger. Improved Proxy Reencryption Schemes with Applications to Secure Distributed Storage. In the 12th Annual Network and Distributed System Security Sympo.
H. Xiong, X. Zhang, W. Zhu, and D. Yao. CloudSeal: End-to$2.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Lotspiech, S. Nusser, and F. Pestoni. Anonymous Trust: Digital Rights Management using Broadcast Encryption. Proceedings of the IEEE 92.6 (2004).
J. Shao and Z. Cao. CCA-Secure Proxy Re-Encryption without Pairings. Public Key Cryptography. Springer Lecture Notes in Computer ScienceVolume 5443 (2009).
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
RTMP (2009). Available online at http://wwwimages.adobe.com/www.adobe.com/content/dam/Adobe/en/devnet/rtmp/ pdf/rtmp specification 1.0.pdf.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Miniconference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).

(56) References Cited

OTHER PUBLICATIONS

Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren, "Derivation of termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. (Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
https://code.google.com/p/ccnx-trace/.

(56) References Cited

OTHER PUBLICATIONS

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusionn: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Hur, "Improving security and efficiency in attribute-based data sharing," IEEE Trans. Knowledge Data Eng., vol. 25, No. 10, pp. 2271-2282, Oct. 2013.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.

McWilliams, Jennifer A., and Iain S. Walker. "Home Energy Article: A Systems Approach to Retrofitting Residential HVAC Systems." Lawrence Berkeley National Laboratory (2005).
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASIER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.

(56) References Cited

OTHER PUBLICATIONS

V. Goyal, O. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.

V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.

Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.

Vutukury, Srinivas, and J. J. Garcia-Luna-Aceves. A simple approximation to minimum-delay routing. vol. 29. No. 4. ACM, 1999.

W.-G. Tzeng and Z.-J. Tzeng, "A public-key traitor tracing scheme with revocation using dynamic shares," in Proc. PKC 2001, Cheju Island, Korea, Feb. 2001, pp. 207-224.

Waldvogel, Marcel "Fast Longest Prefix Matching: Algorithms, Analysis, and Applications", A dissertation submitted to the Swiss Federal Institute of Technology Zurich, 2002.

Walker, Iain S. Best practices guide for residential HVAC Retrofits. No. LBNL-53592. Ernest Orlando Lawrence Berkeley National Laboratory, Berkeley, CA (US), 2003.

Wang, Jiangzhe et al., "DMND: Collecting Data from Mobiles Using Named Data", Vehicular Networking Conference, 2010 IEEE, pp. 49-56.

Xylomenos, George, et al. "A survey of information-centric networking research." Communications Surveys & Tutorials, IEEE 16.2 (2014): 1024-1049.

Yi, Cheng, et al. 'A case for stateful forwarding plane.' Computer Communications 36.7 (2013): 779-791.

Yi, Cheng, et al. 'Adaptive forwarding in named data networking.' ACM SIGCOMM computer communication review 42.3 (2012): 62-67.

Zahariadis, Theodore, et al. "Trust management in wireless sensor networks." European Transactions on Telecommunications 21.4 (2010): 386-395.

Zhang, et al., "Named Data Networking (NDN) Project", http://www.parc.com/publication/2709/named-data-networking-ndn-project.html, Oct. 2010, NDN-0001, PARC Tech Report.

Zhang, Lixia, et al. 'Named data networking.' ACM SIGCOMM Computer Communication Review 44.3 {2014}: 66-73.

D. Trossen and G. Parisis, "Designing and realizing and information-centric Internet," IEEE Communications Magazing, vol. 50, No. 7, pp. 60-67, Jul. 2012.

Gasti, Paolo et al., 'DoS & DDoS in Named Data Networking', 2013 22nd International Conference on Computer Communications and Networks (ICCCN), Aug. 2013, pp. 1-7.

J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

Kaya et al., "A Low Power Lookup Technique for Multi-Hashing Network Applications", 2006 IEEE Computer Society Annual Symposium on Emerging VLSI Technologies and Architectures, Mar. 2006.

Hoque et al., "NLSR: Named-data Link State Routing Protocol", Aug. 12, 2013, ICN'13.

Nadeem Javaid, "Analysis and design of quality link metrics for routing protocols in Wireless Networks", PhD Thesis Defense, Dec. 15, 2010, Universete Paris-Est.

Wetherall, David, "Active Network vision and reality: Lessons form a capsule-based system", ACM Symposium on Operating Systems Principles, Dec. 1, 1999. pp. 64-79.

Kulkarni A.B. et al., "Implementation of a prototype active network", IEEE, Open Architectures and Network Programming, Apr. 3, 1998, pp. 130-142.

\* cited by examiner

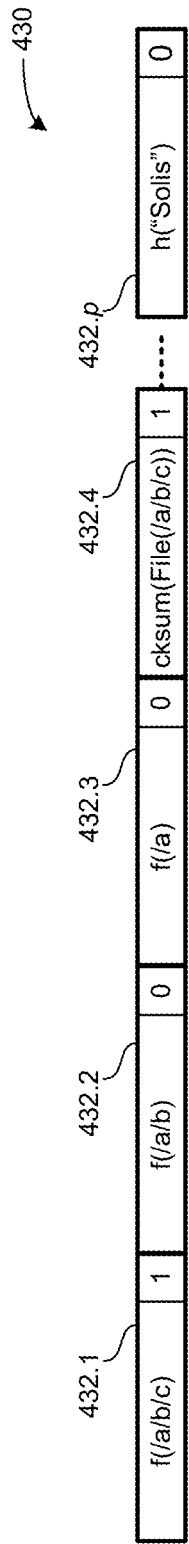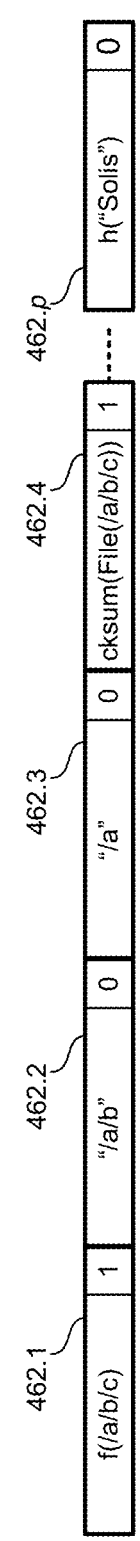

ORDERED-ELEMENT NAMING FOR NAME-BASED PACKET FORWARDING

BACKGROUND

Field

This disclosure is generally related to routers. More specifically, this disclosure is related to using an ordered-element name, which includes fixed-length elements, to forward an interest for a content item.

Related Art

The proliferation of the Internet and mobile-related Internet services continue to fuel revolutionary changes in the network industry. Today, a significant number of information exchanges, from online movie viewing to daily news delivery, retail sales, and instant messaging, are conducted online, and oftentimes on a mobile computing device. An increasing number of Internet applications are also becoming mobile, while the current Internet operates on a largely location-based addressing scheme. The two most ubiquitous protocols, the Internet Protocol (IP) and Ethernet protocol, are both based on location-based addresses. That is, a consumer of content can only receive the content by explicitly requesting the content from an address (e.g., IP address or Ethernet media access control (MAC) address) closely associated with a physical object or location. This restrictive addressing scheme is becoming progressively inadequate for meeting the ever-changing network demands.

In general, a network device, such as an IP router or Ethernet switch, receives a packet at one of its input ports (e.g., a network interface). The device then performs a lookup to identify an output port to which the packet should be forwarded based on the packet's destination address. An IP router typically uses a longest-prefix-match lookup engine to process an IP address tied to a physical location, whereas an Ethernet switch uses an exact-match lookup engine to process a MAC address tied to a physical device. These devices are not adapted to process a packet based on a name for a piece of content.

SUMMARY

One embodiment provides a name-generating system that generates an ordered-element name for a content item. During operation, the system obtains name-generating information associated with the content item, and generates one or more fixed-length elements for the content item. Each fixed-length element of the ordered-element name is mapped to the content item or to a context associated with the content item. The system determines an ordering for the fixed-length elements, which orders the one or more fixed-length elements from a highest matching priority to a lowest matching priority. The system then generates an ordered-element name, for the content item, to include the one or more fixed-length elements in the determined ordering.

In some embodiments, the system determines the ordering by determining a matching priority for a respective fixed-length element, such that a matching priority for a respective fixed-length element is based on the corresponding name-generating information. The system then determines the ordering, for the one or more fixed-length elements, from a highest matching priority to a lowest matching priority.

In some embodiments, the context mapped to by the fixed-length element is associated with one or more of: a group of data to which the content item belongs; an entity associated with an interest packet for the content item; an entity which stores the content item; and an entity which generates the content item.

In some embodiments, the name-generating information includes one or more of: an ordered-element name associated with the content item, hierarchically structured variable-length identifier (HSVLI) associated with the content item, a filename associated with the content item, or structured information for the content item. The name-generating information can also include a location identifier, such as a universal resource identifier (URI) for the content item, and/or domain name system (DNS) information associated with the content item.

In some variations, the name-generating information can include information related to the content item. This name-generating information can include a timestamp associated with the content item, a location associated with the content item, an entity associated with the content item, a portion of the content item, data included in the content item, a keyword associated with content of the content item, a keyword for a category associated with the content item, and/or a keyword for an organization associated with the content item.

In some variations, the name-generating information can include information related to a content producer, creator, publisher or owner of the content item, and/or can include information related the content requester, consumer or user. The name-generating information can also include information related a physical environment, a runtime environment, information obtained from a user, or a randomly generated number.

In some embodiments, the ordered-element name includes a set of flags for a respective element. Further, the set of flags can include a termination flag, a non-terminal flag, and/or an exclude flag. When the termination flag is set for a corresponding fixed-length element, the flag indicates that a successful exact-match lookup for the corresponding element satisfies a lookup for the content item. When the non-terminal flag is set for a corresponding fixed-length element, the non-terminal flag indicates that an exact-match lookup for the corresponding fixed-length elements identifies routing information for the content item, but does not satisfy an exact-match lookup for the content item.

When the exclude flag is set for a corresponding fixed-length element and an exact-match is identified for the corresponding fixed-length element, the exclude flag indicates that the ordered-element name does not satisfy a match even if a successful match is identified for other fixed-length elements of the ordered-element names.

In some embodiments, the ordered-element name also includes metadata associated with the content item. The metadata can include a content type, data-version information, data-format information.

In some variations, the metadata can also include author-related information that identifies an entity which generated the content item, and/or authentication information that authenticates the entity which generated the content item. The metadata can include content author information, name-generator information.

In some variations, the metadata can also include encryption information that indicates an encryption technique used to encrypt the content item, a version identifier for the content item, and/or a format identifier for the content item.

In some variations, the metadata can include contextual information related for the content item. This metadata can include network status information, an error code, time information, location information, user-behavior information, and security-related information.

In some embodiments, the ordered-element name also includes a set of attribute fields indicating attributes used to generate the ordered-element name. The set of attribute fields indicate one or more of: context information associated with the content item; a filename for the content item; metadata associated with the content item; and a hierarchically structured variable-length identifier (HSVLI) for the content item.

In some embodiments, to generate a fixed-length element, the system can derive a unique fixed-length identifier using a predetermined function that takes as input at least one attribute of the content item, compute a hash using the attribute of the content item, and/or compute a hash based on at least a portion of the content item.

In some embodiments, the system can compute the hash using a predetermined hash function to compute the hash, using the predetermined hash function and a secret salt to compute a salted hash, and/or using a cryptographic function and a secret key to produce a fixed-length encrypted value from the hash or the salted hash.

One embodiment provides a packet-generating system that generates a packet associated with an ordered-element name. During operation, the system generates an ordered-element name for a content item. The ordered-element name includes one or more fixed-length elements ordered from a highest priority to a lowest priority, such that a respective fixed-length element is mapped to the content item or to a context associated with the content item. The system can generate a packet that includes the ordered-element name for the content item. The system determines a packet type for the packet, and determines a target location for the packet based on the ordered-element name. The system then sends the packet to the determined target location.

In some embodiments, the target location can include a data repository within the local computing device, an application executed by the local computing device, a remote computing device, and/or an application executed by the remote computing device.

In some embodiments, the context mapped to by the fixed-length element is associated with a group of data to which the content item belongs, an entity associated with an interest packet for the content item, an entity which stores the content item, and/or an entity which generates the content item.

In some embodiments, the packet type is a data packet that includes the content item, such that the ordered-element name facilitates matching an interest for the content item to the data packet.

In some embodiments, the packet type is an interest packet that includes an interest for the content item, such that the interest indicates the ordered-element name to facilitate forwarding the interest to a remote computing device that satisfies the interest for the content item.

In some embodiments the packet type is a control packet, which facilitates advertising the content item to one or more remote devices.

In some embodiments, the system generates the interest packet to include reverse-path information that is used by a remote computing device to send a data packet that includes the content item to the local computing device.

In some embodiments, the system generates the ordered-element name to include a set of flags that facilitate processing the fixed-length elements of the ordered-element name. The set of flags can include a termination flag, a non-terminal flag, and/or an exclude flag.

In some embodiments, the interest packet also includes data associated with the interest.

In some embodiments the system maintains a data repository, which facilitates determining when a data packet needs to be sent to a remote device.

In some variations, the data repository includes a forwarding information base (FIB), which maps a fixed-length element to one or more remote devices.

In some variations, the data repository includes a pending interest table (PIT), which maps a respective fixed-length element of an interest packet to the interest packet.

In some embodiments, while determining the target location, the system performs an exact-match lookup operation on the FIB, based on the ordered-element name, to identify a remote computing device. Then, to send the packet to the target location, the system sends the interest packet to the identified remote computing device.

In some embodiments, the system stores the interest packet in the PIT. Then, in response to receiving the content item from the remote computing device, the system removes the interest packet from the PIT.

In some embodiments, the system maintains a repository, which maps a respective packet to one or more remote devices, to keep track of when a packet has been sent to a remote device.

One embodiment provides a packet-processing system, which processes a packet to identify and perform an action necessary for processing the packet. During operation, the system receives a packet which includes an ordered-element name for a content item. The ordered-element name includes one or more fixed-length elements ordered from a highest priority to a lowest priority, such that a respective fixed-length element is mapped to the content item or to a context associated with the content item. The system determines a packet type for the received packet, and determines a packet-processing operation for the packet, based on the packet's ordered element name and/or packet type. The system then performs the packet-processing operation to process the received packet.

In some embodiments, while determining the packet-processing operation, the system determines a target packet-processing operation corresponding to the packet type. The system then performs a target-device-lookup operation, based on the packet type, to identify a target computing device that is to perform the target packet-processing operation.

In some embodiments, the target-device-lookup operation involves one or more of: performing an exact-match lookup operation based on the packet type; performing an exact-match lookup operation based on the ordered-element name; performing a wildcard-lookup operation based on the packet type; and performing a wildcard-lookup operation based on the ordered-element name.

In some embodiments, the target computing device is a remote computing device. Also, while performing the packet-processing operation, the system forwards the packet to the remote computing device. The system can also store the packet, such as an interest packet, in a local repository which maps a respective fixed-length element of the packet to the packet.

In some embodiments, the target computing device is the local computing device. Also, while performing the packet-processing operation, the system obtains a stored packet from a local repository, such that packet corresponds to the ordered-element name. The system then sends the stored packet to a remote computing device from which the local computing device received the original packet.

In some embodiments, the target computing device is the local computing device. Also, while performing the packet-processing operation, the system generates a packet based on information from the received packet, and sends the generated packet to a remote computing device from which the local computing device received the original packet.

In some embodiments, while generating the packet, the system determines data-generating parameters based on a fixed-length element of the original packet's ordered-element name, an attribute indicated by the ordered-element name, metadata indicated by the original packet or the ordered-element name, and/or a data object stored in the original packet. Further, the system can generate the response packet based on the determined data-generating parameters.

In some embodiments, the target computing device is the local computing device. Also, while performing the packet-processing operation, the system provides the packet to an application executing on the computing device to determine an application-specific operation for processing the packet.

In some embodiments, the packet corresponds to an interest packet, and while processing the interest packet, the system performs an exact-match lookup operation on a forwarding information base (FIB) to identify a target computing device that satisfies the interest for the content item. The system can also store the interest packet in a pending interest table (PIT), which maps a respective fixed-length element of the interest packet to the interest packet. For example, the target computing device may correspond to a remote computing device, and the packet-processing operation may involve forwarding the interest packet to the remote computing device. Then, in response to receiving the content item from the remote computing device, the system removes the interest packet from the PIT.

One embodiment provides a content-advertising system, which advertises the presence of data to other computing devices. During operation, the system detects a first content item to advertise to other computing devices, and generates an advertisement for the first content item. The advertisement indicates one or more of the fixed-length elements to advertise the presence of the first content item in a local repository. The system then sends the advertisement to one or more neighboring nodes of a computer network.

In some embodiments, the system receives an advertisement for a second content item, from a target entity that satisfies an interest in the second content item. The system then determines forwarding information for the target entity, and adds the fixed-length elements of the received advertisement into a forwarding information base (FIB). The FIB maps a respective fixed-length element to the forwarding information associated with the target entity.

In some embodiments, the content item can include a content item stored within a local repository, a content item that is to be generated by a local computing device, or a content item that is hosted by a remote computing device.

BRIEF DESCRIPTION OF THE FIGURES

FIG. 4B illustrates exemplary ordered-element name that includes fixed-length elements in accordance with an embodiment.

FIG. 4C illustrates exemplary ordered-element name that includes fixed-length elements and HSVLI components in accordance with an embodiment.

In the figures, like reference numerals refer to the same figure elements.

DETAILED DESCRIPTION

Figure 1:
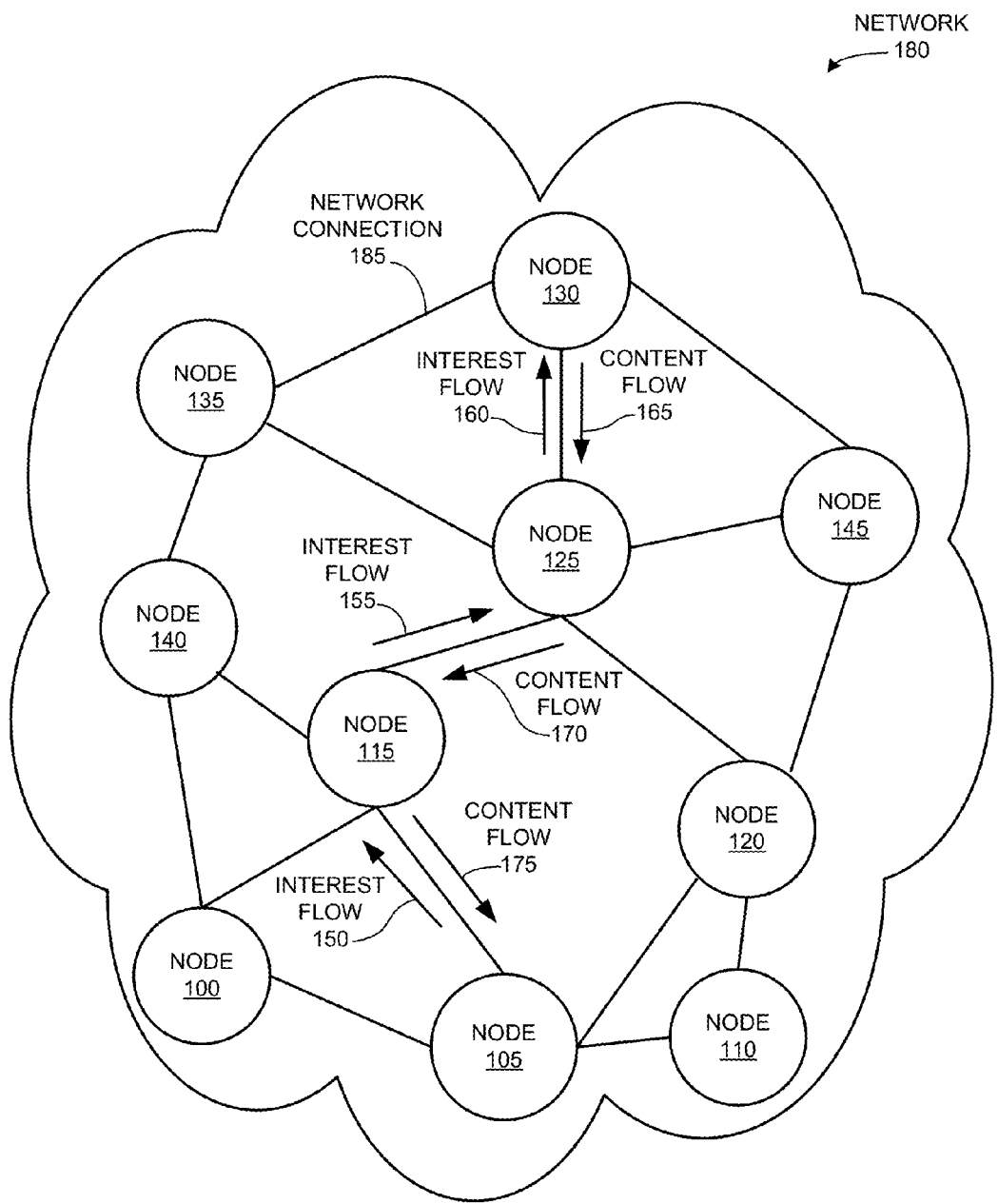
FIG. 1 illustrates an exemplary network where packets have hierarchically structured variable-length identifiers (HSVLIs) in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system of network devices that facilitate disseminating and routing data packets across a computer network using ordered-element names. The ordered-element name includes one or more fixed-length elements, ordered based on a matching priority for the individual elements. In some embodiments, the network devices that process data packets can match a fixed-length element of the ordered-element name, based on their ordering, to a content item or to another network device that may be able to obtain the content item. The network devices that use these ordered-element names can include a content producer or a content consumer (e.g., a personal computing device), a wireless access point, a proxy server, a network firewall, and/or a network router.

For example, an end-host device can generate a an ordered-element name for a content item by deriving multiple fixed-length elements that can be used by an exact-match engine, and orders these elements to form an ordered-element name. The end-host device can derive these fixed-length elements from the content item's attributes (e.g., from the content item's name, author, subject, etc.), or from the content item itself (e.g., to form a checksum value). A router can use exact-match switching equipment, such as Ethernet switches, to forward packets based on the ordered-element name for the content item.

The end-host device can include a desktop computer, a smartphone, a computer tablet, a laptop computer, a wearable computing device (e.g., a watche), an embedded computing device, a smart appliance, etc. The end-host device can communicate and request data by generating and disseminating interest packets via a computer network. These interest packets are similar to the data packets, whose payload can include an ordered-element name describing the data that the end-host device is interested in. The interest packet's payload can also include additional information that can be used to identify the data that is being requested.

In some embodiments, the data of interest may not exist yet. The ordered-element name contained in an interest packet can be used to identify an existing data item, as well as to guide the interest packet to a network location where a copy of the data item may reside or may be generated.

In some embodiments, a network device can receive an interest packet via a computer network, and processes the interest packet, for example, to forward the interest packet to another device, store the interest packet, modify the packet, or discard the interest packet. Also, if the network device has a stored copy of the data item named in the interest packet, the device can respond to the interest packet by generating a data packet that includes the data item, and sending this data packet to the network device from which it received the interest packet. When the network device performs a lookup operation using an ordered-element name, the device can identify a match without requiring an exact match between two ordered-element names. A match is identified when a subset of elements in the ordered-element names are equal.

In some embodiments, a network device can generate and disseminate advertisement packets to other devices in the network, such that an advertisement packet indicates a data item that resides locally and/or in another network device. The advertisement packet can use an ordered-element name (or a set of unordered fixed-length elements) to identify the content item, which allows other network devices to perform a lookup using any of the name elements of the ordered-element name. An advertisement packet does not need to explicitly advertise a unique data packet or elements of the ordered-element name of a packet. For example, an advertisement can indicate a set of name elements for groups of data. Interest packets oftentimes include at least some group-identifying name elements that have been advertised, and network devices can use these group-identifying name elements to forward these interest packets by matching these name elements to one or more of the advertised fixed-length elements.

One embodiment provides a device that converts named data into a set of ordered-element named packets. The device can use a component or portion of the original name and/or metadata of the named data to generate ordered-element names for one or more ordered-element data packets. In some embodiments, the original name can include any name that indicates key words or attributes for the named data. For example, the original name can include a hierarchically structured variable-length identifier (HSVLI). The HSVLI identifies the content item, and comprises contiguous components ordered in a hierarchy from a most general level of the hierarchy to a most specific level of the hierarchy.

When the router device receives packets named with an ordered-element name, the router can process a packet based on its ordered-element name, for example, to forward the packet to another device, to store the packet, to modify the packet and forward them to another device, or to discard the packet. The ordered-element name, which is also referred to as a Structured Flat Name (SFN), includes a list of fixed-length elements ordered from a highest priority to a lowest priority.

The router device can include an exact-match lookup engine that can compare fixed-length addresses, such as an exact-match lookup engine for Ethernet MAC addresses. The device can process the ordered-element names using the lookup engine to effectively perform a longest-prefix-match lookup on hierarchically structured variable-length identifiers (HSVLIs), or on any type of structured name now known or later developed.

An HSVLI indicates a piece of content, is hierarchically structured, and includes one or more contiguous components ordered from a most general level to a most specific level. The length of a respective HSVLI is not fixed. Embodiments of the present invention involve converting the HSLVI, which includes one or more hierarchical components, into an ordered-element name (also referred to as a Structured Flat Name, or SFN) that can be processed using the exact-match lookup engine.

Techniques for performing an exact-match lookup using an HSVLI are also described in U.S. Pat. No. 8,243,735, entitled "System for Forwarding Packets with Hierarchically Structured Variable-Length Identifiers using an Exact-Match Lookup Engine," by inventors Van L. Jacobson and James D. Thornton, the disclosure of which is incorporated by reference in its entirety herein.

Embodiments of the present invention can also be applied to content-centric networks (CCNs). Content-centric networks—where routing is based on interests rather than addresses—bring a new approach to content transport. Instead of having network traffic viewed at the application level as end-to-end conversations over which content travels, content is requested or returned based in part on the name given to it, and the network is responsible for routing content from the provider to the consumer. Content includes data that can be transported in the communication system, and can be any form of data such as text, images, video, and/or audio. A consumer and a provider can be a person at a computer or an automated process inside or outside the network. In such a network, a piece of content can refer to the entire content or a respective portion of the content. For example, a newspaper article might be represented by multiple pieces of content embodied as data packets. A piece of content can also be associated with metadata describing or augmenting the piece of content with information such as authentication data, creation date, content owner, etc.

In content-centric networks, unlike a conventional IP network, a packet may be identified by an HSVLI. For example, "abcd/bob/papers/ccn/news" could be the name of the content and identifies the corresponding packet(s); i.e., the "news" article from the "ccn" collection of papers for a user named "Bob" at the organization named "ABCD."

To request a piece of content, a node expresses (e.g., disseminates, or broadcasts) an interest in that content by the content's name. An interest in a piece of content can be a query for the content according to the content's name or identifier. The content, if available in the network, is routed back to the node from any node that stores the content. The routing infrastructure intelligently propagates the interest to the prospective nodes that are likely to have the information, and then carries available content back along the path which the interest traversed.

As mentioned above, HSVLIs refer to content, and it is desirable that they be able to represent organizational structures for content and be at least partially meaningful to humans. An individual component of a HSVLI may have an arbitrary length, HSVLIs can have explicitly delimited components, can include any sequence of bytes, and are not limited to human-readable characters. A longest-prefix-match lookup is important in forwarding packets with HSVLIs. For example, an HSVLI indicating an interest in "/parc/home/solis" will match both "/parc/home/solis/alpha.txt" and "/parc/home/solis/beta.txt." The longest match, in terms of the number of name components, is considered the best because it is the most specific.

FIG. 1 illustrates an exemplary architecture of a network 180, in accordance with an embodiment of the present invention. In this example, network 180 comprises nodes 100-145. Each node in network 180 is coupled to one or more other nodes. Network connection 185 is an example of such a connection. In FIG. 1, network connections are shown as a solid line, but each line could also represent sub-networks or super-networks, which can couple one node to another node. Network 180 can be content-centric, a local network, a super-network, or a sub-network. Each of these networks can be interconnected so that a node in one network can reach a node in other networks. The network connection can be broadband, wireless, telephonic, satellite, or any type of network connection. A node can be a computer system, an end-point representing users, and/or a device that can generate interests or originate content.

In accordance with an embodiment of the present invention, a consumer can generate an interest in a piece of content, and can send that interest to a node in network 180. The piece of content can be stored at a node in network 180 by a publisher or content provider, who can be located inside or outside the network. For example, in FIG. 1, the interest in a piece of content originates at node 105. If the content is not available at the node, the interest flows to one or more nodes coupled to the first node. For example, in FIG. 1, the interest flows (interest flow 150) to node 115, which does not have the content available. Next, the interest flows (interest flow 155) from node 105 to node 125, which again does not have the content. The interest then flows (interest flow 160) to node 130, which does have the content available. The flow of the content then retraces its path in reverse (content flows 165, 170, and 175) until it reaches node 105, where the content is delivered. Other processes such as authentication can be involved in the flow of content.

In network 180, any number of intermediate nodes (nodes 100-145) in the path between a content holder (node 130) and the interest generation node (node 105) can participate in caching local copies of the content as it travels across the network. Caching reduces the network load for a second subscriber located in proximity to other subscribers by implicitly sharing access to the locally cached content.

In some embodiments, some network nodes can include a network forwarder system, such as network routers (e.g., nodes 115 and 125), and optionally the network end-hosts (e.g., nodes 105 and 130). The network forwarder system can include a forwarding information base (FIB) that stores individual name elements for a plurality of content items, and associates each name element with forwarding information associated with the corresponding content item. The network forwarder system forwards data packets and interest packets by using the FIB to perform an exact-match lookup operation against one or more fixed-length elements of the ordered-element name for a piece of content. The network forwarder system can also include a content repository (also referred to as a content store) that includes a plurality of content items, each of which is associated with one or more name elements that can uniquely identify the content item. If the network forwarder system receives an interest with a name element matching an entry in the content repository, the system can satisfy the interest by returning the corresponding content.

In some embodiments, some network nodes can include a network helper system that interfaces between applications and the network. For example, the network helper system can analyze network traffic (e.g., data packets and interest packets) to convert a structured name into an ordered-element name for the content. The network helper system can reside at certain network devices that provide access to content, such as interest generation node 105 or content holder 130. The network helper system can also reside at network nodes that provide network access to end-host devices, such as intermediate nodes 115 or 125 that may implement a wireless access point or a home router.

Generating and Using Fixed-Length Elements for Forwarding Packets

Conventional packet forwarding is based on addresses assigned to nodes (or interfaces of nodes). For example, in Ethernet forwarding, a 48-bit MAC address of an Ethernet frame is used for an exact-match lookup in a forwarding table to determine the output port on the switch for the frame. However, such exact-match lookup is not suitable for forwarding packets based on a name for a content item (e.g., an HSVLI). First, the Ethernet-style exact-match lookup can only handle a fixed-length MAC address, whereas an ordered-element name for a content item can have a variable number of fixed-length "elements." Second, Ethernet-style lookup engines can only perform exact-match lookups, whereas a name for the content item can vary in length. For example, an HSVLI can include several variable-length "components," such that the hierarchical structure of an HSVLI calls for a longest-prefix-match of the HSVLI components to have a higher priority than other matching component subsets.

Ethernet switches are not designed to route packets across a large-scale network (such as the Internet) and are only intended to forward packets between small-scale networks (such as local-area networks). As a result, hierarchical routing is not a requirement in the original Ethernet protocol. However, packets that are to be forwarded based on their original name or HSVLIs may travel across networks of any size (such as the Internet), and name-based hierarchical routing is more suitable. For hierarchical routing, longest-prefix-match lookup is more efficient and scalable than exact-match lookup. In this disclosure, longest-prefix-match lookup refers to the process of performing a lookup based on attributes of a content item's original name or the content item itself. The system can perform the longest-prefix-match lookup, for example, based on an ordered-element name for an HSVLI, which returns a result matching an element that corresponds to the largest number of HSVLI components, from the highest to the lowest hierarchy of the HSVLI.

Recall that a piece of content can be associated with metadata describing or augmenting the piece of content with information such as authentication data, creation date, content owner, etc. In some embodiments, the system can generate one or more of the fixed-length elements from attributes of the piece of data, such as based on metadata, or based on the piece of content itself. For example, the system can use a predetermined function, such as a hash function, to generate a fixed-length element from one or more metadata elements. The system can also generate a fixed-length element by generating a checksum of the piece of content itself. Hence, by generating an ordered-element name based on the attributes of the piece of content, an end-host can disseminate an interest that uniquely identifies a desired version of the content.

In some embodiments, the network helper system can generate an interest that realizes network security. For example, a content producer's system can use a cryptographic operation to generate a name element for a piece of content, thus producing an encrypted name element. This way, only content consumers that know the necessary encryption key can generate an interest capable of accessing the content. If a content consumer generates an interest that includes the necessary name elements for reaching the content producer, but does not generate the encrypted name element for the content item, the content producer can ignore the interest as it does not match the interest for the content item. Also, the ordered-element names can be signed (e.g., using a digital certificate), which allows a content producer to authenticate a content consumer.

In some embodiments, the network helper system can generate an interest that realizes network privacy. For example, a network consumer can generate an interest for a content item so that the interest includes name elements for the content item (which are fixed-length keys), but does not include a structured name for the content item (e.g., an HSVLI that can identify the content by human-readable key words). Hence, the interest allow a content consumer to obtain content without identifying any given physical computer or location associated with a specific content producer, and without using human-readable names that can provide insight into the content being requested.

Network Helper System for Generating Ordered-Element Names

In embodiments of the present invention, the packet-forwarding system facilitates accessing content over a network using an ordered-element name for the content. The fixed-length elements of the ordered-element name can be derived from the content's original name (e.g., an HSVLI for the content), from content tags associated with the content, and/or from the content itself.

Some network devices can include a network helper system that analyzes network traffic, such as an interest for content, to convert a structured name into an ordered-element name for the content. The network helper system can reside at certain network devices that provide access to content, such as at an end-host device (e.g., a personal computing device) that generates content or an interest for content, or at an access point for end-host devices.

The ordered-element name can include one or more fixed-length elements that can be used to perform an exact-match lookup for determining forwarding information. The network helper system can use the ordered-element name to access the content locally (e.g., to satisfy an interest from a remote device), or to access the content from a remote device (e.g., by generating and disseminating an interest that indicates the ordered-element name). When the network helper system disseminates an interest across a network, network routers can use a fixed-length, exact-match lookup engine to forward the interest based on the ordered-element name, without having to first convert an HSVLI into the ordered-element name at run-time.

Figure 2A:
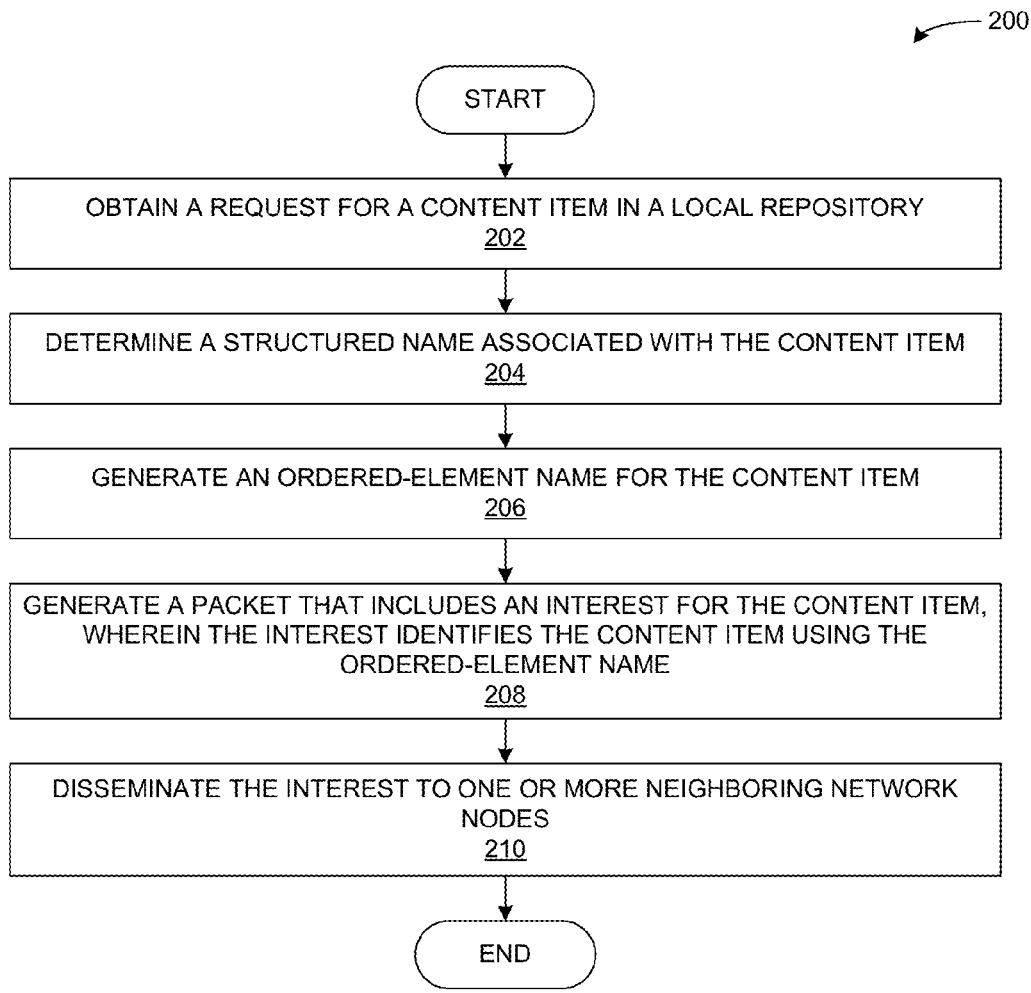
FIG. 2A presents a flow chart illustrating a method for generating and disseminating an interest that includes an ordered-element name for a content item in accordance with an embodiment.

FIG. 2A presents a flow chart illustrating a method for generating and disseminating an interest that includes an ordered-element name for a content item in accordance with an embodiment. During operation, the system obtains a request for a content item (operation 202), and determines a structured name for the content item (operation 204). The system then generates an ordered-element name for the content item, based on the structured name (operation 206), and can generate a packet that includes an interest for the content item (operation 208). The interest can include the ordered-element name that identifies the content item. To obtain the content item, the system disseminates the interest to one or more neighboring network nodes (operation 210).

In some embodiments, the end-host device can include a content repository that stores a plurality of content items. The device can make these content items accessible from other remote devices by advertising its local collection to other neighboring nodes of the computer network. For example, the network-helper system can advertise the presence of a content item by providing one or more fixed-length elements for the content item to the neighboring network nodes, such as a router.

Figure 2B:
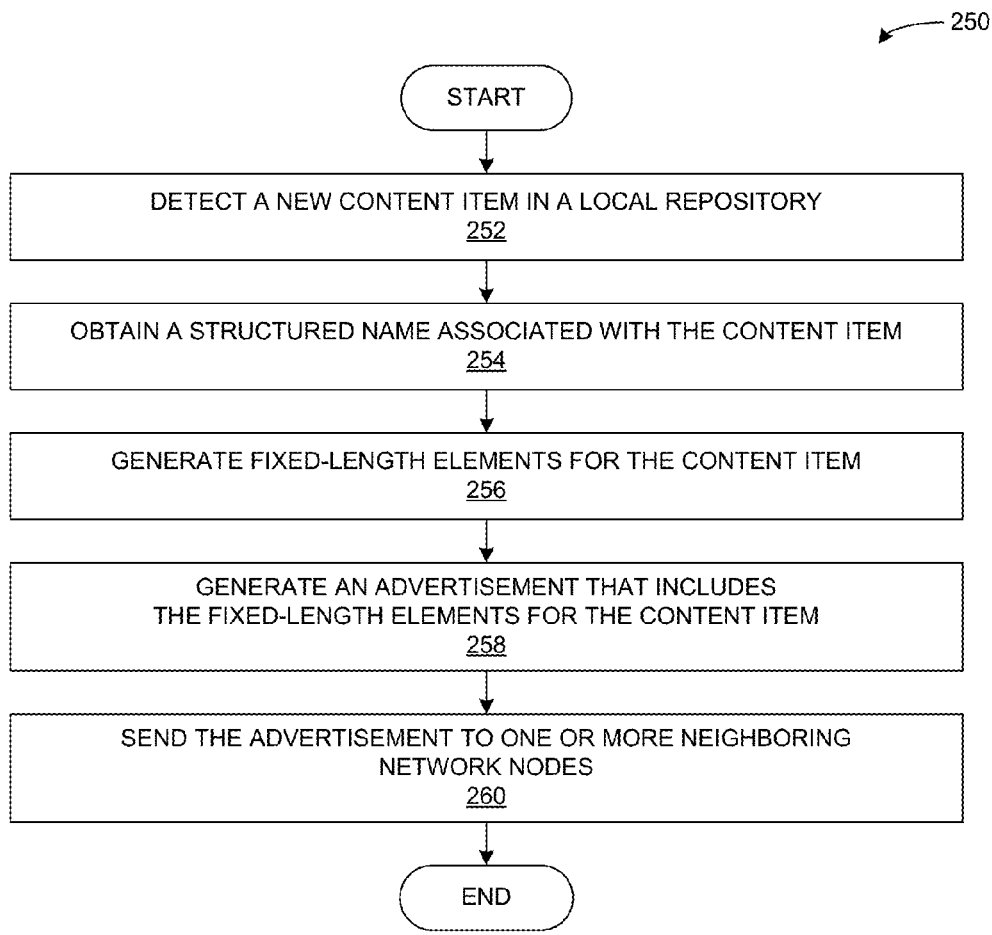
FIG. 2B presents a flow chart illustrating a method for synchronizing a content repository with other neighboring network nodes based on ordered-element names for content items in accordance with an embodiment.

FIG. 2B presents a flow chart illustrating a method for synchronizing a content repository with other neighboring network nodes based on ordered-element names for content items in accordance with an embodiment. During operation, the system can detect a new content item in a local repository (operation 252). For example, the content item can be a new object, such as a new file created or downloaded by a local user (e.g., a document, a picture, or a video), or can be an automatically generated object such as a system log file. The content item can also include a new or updated version of an existing object, such as a revised word-processing document, spreadsheet, etc.

The system can obtain a structured name for the content item (operation 254), and generates one or more fixed-name elements for the content item based on the structured name and/or other attributes of the content item (operation 256). The system then generates an advertisement that includes the fixed-length elements for the content item (operation 258), and sends a packet that includes the advertisement to one or more neighboring network nodes (operation 260).

The system can also process advertisements from other computing devices. For example, the system can receive an advertisement from a target entity that stores or generates a content item (e.g., satisfies an interest in the content item). The system then determines forwarding information for the target entity, and adds the fixed-length elements of the received advertisement into a forwarding information base (FIB). The FIB maps a respective fixed-length element to the forwarding information associated with the target entity.

In some embodiments, the network helper system can generate an ordered-element name for a content item to include a set of flags that guide a router while processing an interest for the content item, such as a termination flag, a non-terminal flag, and an exclude flag. When the termination flag is set for a corresponding fixed-length element, the flag indicates that a successful exact-match lookup for the corresponding element satisfies a lookup for the content item. For example, the system can set a termination flag for a given fixed-length element which is exclusively associated with the content item, which informs the router that a successful match for this element satisfies an exact match for the content item's data, or satisfies an exact match for the content item's original name (e.g., an HSVLI). Hence, when the system detects an exact match for an element whose termination flag is set, the system determines that the detected match is sufficient for satisfying the interest without processing other fixed-length elements.

When the non-terminal flag is set for a corresponding fixed-length element, the non-terminal flag indicates that an exact-match lookup for the corresponding fixed-length elements identifies routing information for the content item, but does not satisfy an exact-match lookup for the content item. However, when the exclude flag is set for a corresponding fixed-length element and an exact-match is identified for the corresponding fixed-length element, the exclude flag indicates that the ordered-element name does not satisfy a match even if a successful match is identified for other fixed-length elements of the ordered-element names.

As another example, the system can set the non-terminal flag for fixed-length elements that are not exclusively associated with the content item, such as fixed-length elements that were generated from information that facilitates forwarding an interest to a content producer or content holder. On the other hand, the system can set the exclude flag for fixed-length elements that are intended to indicate explicitly failed lookup operations. For example, the system can determine contextual information indicating when a packet is not to be forwarded to a target device or by a target device (e.g., by a firewall), and can set the exclude flag for fixed-length elements derived from this information.

Figure 3:
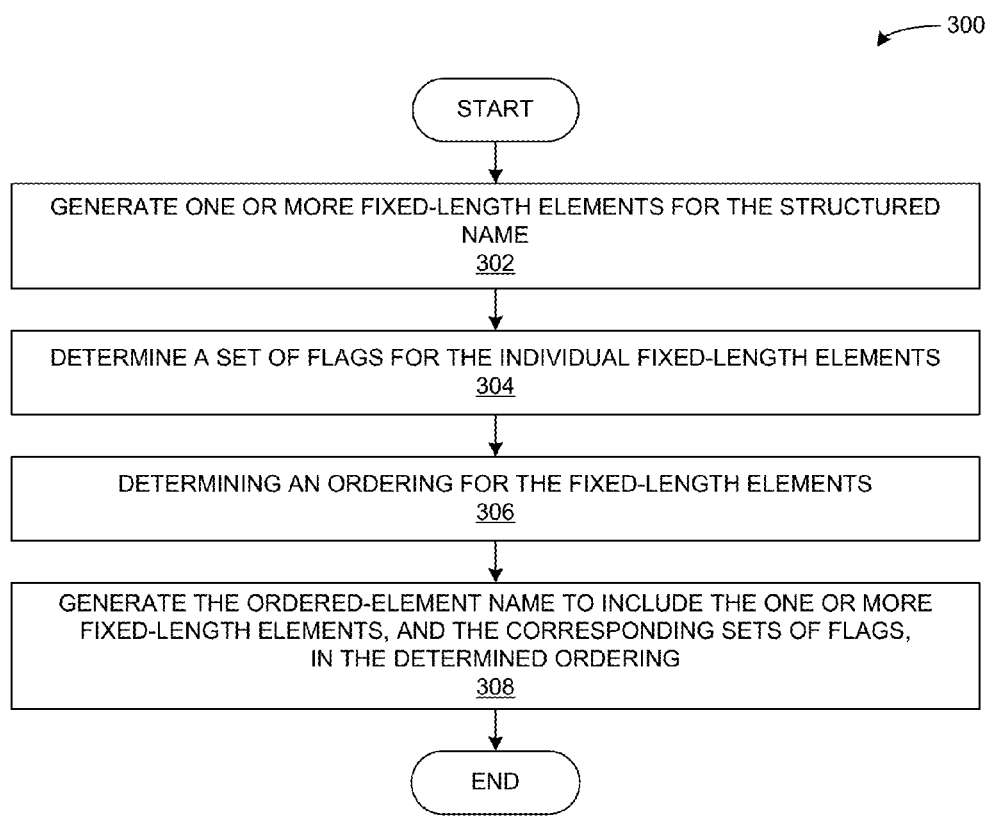
FIG. 3 presents a flow chart illustrating a method for generating an ordered-element name for a content item in accordance with an embodiment.

FIG. 3 presents a flow chart illustrating a method for generating an ordered-element name for a content item in accordance with an embodiment. During operation, the system generates one or more fixed-length elements for the structured name (operation 302), and determines a set of flags for the individual fixed-length elements (operation 304).

As mentioned above, the set of flags can include a termination flag, which when set, informs a router that a successful match for this element is sufficient for satisfying the interest. However, other flags are possible. For example, some flags can indicate a type for the fixed-length element, such as to indicate whether the element is derived from HSVLI components, from content tags, or from the content itself. Other flags can indicate a type of function that was used to generate the fixed-length element, such as to indicate a specific hash function. During operation 304, the system can determine values for any type of flag, either now known or later developed, for controlling the exact-match lookup.

The system also determines an ordering for the fixed-length elements (operation 306), for example, in parallel to or after generating the fixed-length elements and/or the set of flags. The system then generates an ordered-element name to include the one or more fixed-length elements, and the corresponding set of flags, in the determined ordering (operation 308).

Figure 4A:
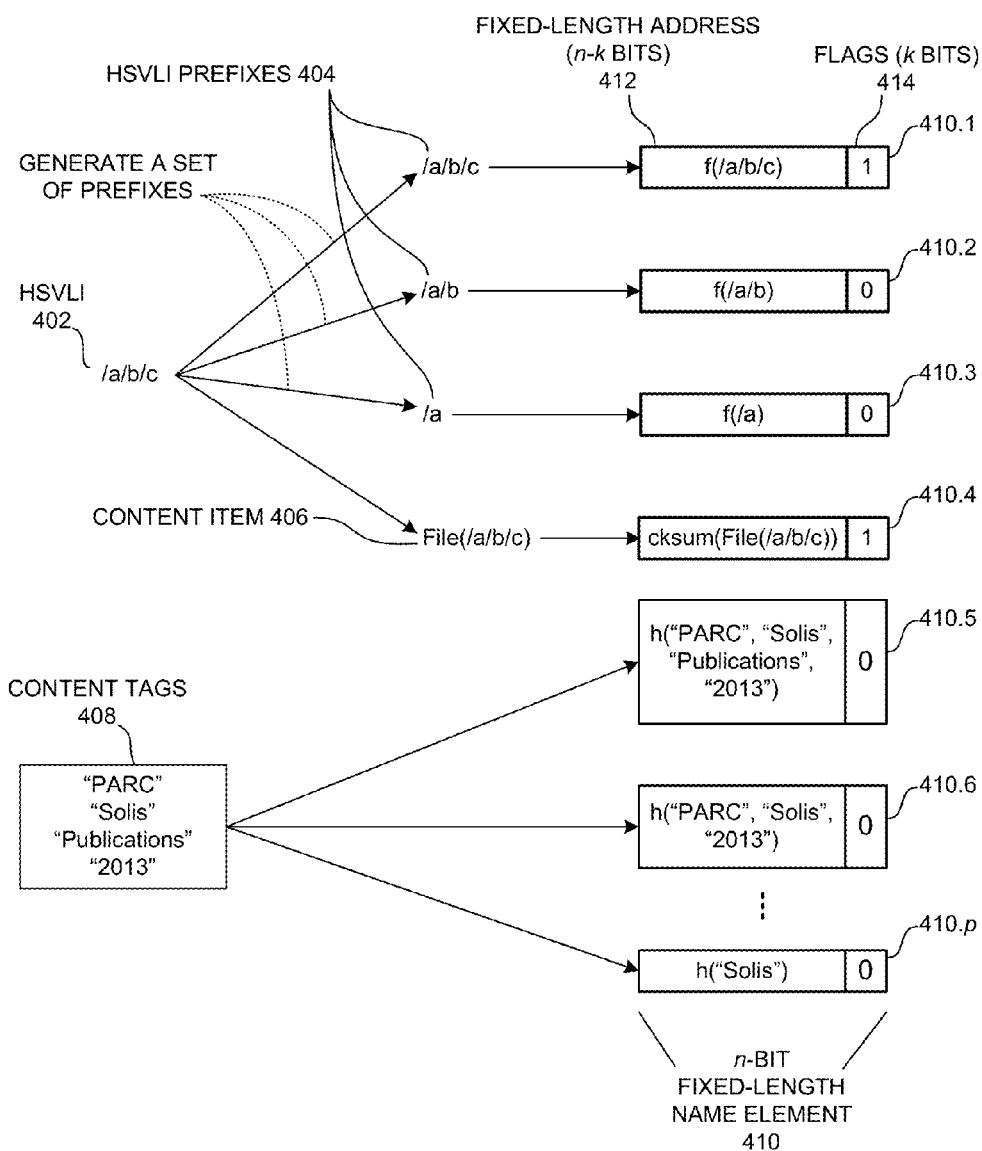
FIG. 4A illustrates exemplary fixed-length name elements generated from an HSVLI for a content item, content tags, and/or the content item in accordance with an embodiment.

FIG. 4A illustrates exemplary fixed-length name elements 410 generated from a content item 406, an HSVLI 402 for content item 406, content tags 408 in accordance with an embodiment. The system can use HSVLI 402 (e.g., "a/b/c") to produce a set of prefixes 404, which can be ordered from the most specific to the most general. For example, the system can produce prefixes 404 of HSVLI 402 to include "/a/b/c," "/a/b," and "/a." The system can convert each of these prefixes into an n-bit fixed-length address, such as addresses 412 for a name element 410.1. The system can also generate a set of k flags for each fixed-length address, and creates an n-bit fixed-length element by appending the n–k bit address and the k bit flags. For example, the system can append flags 414 after address 412 as shown in FIG. 4, or the system can append flags 414 before address 412 (not shown).

The most-specific prefix can be unique to a desired content item, and so the system assigns a highest priority to the address for the most-specific prefix, and enables the termination flag for this address (e.g., sets the termination flag to "1"). The system assigns a priority for other prefixes relative to their level of the HSVLI hierarchy, and orders these prefixes based on their priority (e.g., each prefix is ordered after other more-specific prefixes, and before other more-general prefixes).

The system can create a name element 410.1 by converting "/a/b/c" into n–k bit fixed-length address 412 with a value "f(/a/b/c)," and setting the value for the termination flag to "1" because the prefix corresponds to a most-specific level of the HSVLI hierarchy. Similarly, the system can create a name element 410.2 by converting "/a/b" into n–k bit fixed-length address with a value "f(/a/b)," and setting the value for the termination flag to "0" because the prefix does not correspond to a most-specific level of the HSVLI hierarchy. Note that "f(/a/b/c)" is a shorthand notation for the fixed-length address, which is derived from the prefix "/a/b/c" by entering the prefix into a predetermined function f( ) Each fixed-length address can be generated to include a predetermined number of bits (e.g., n–k bits). If function f( ) produces an output with less than n–k bits, the system can pad the result with a sufficient number of '0' bits to produce a fixed-length address with n–k bits. As mentioned above, various methods can be used to derive a fixed-length address from a prefix, such as by using a hash function ho. Other prefixes in FIG. 6 can be similarly converted to n–k bit fixed-length addresses.

The system can also generate a fixed-length address for content item 406 by computing a hash of content item 406, such as a checksum (e.g., "cksum(File(/a/b/c))"). In some embodiments, the system may obtain the checksum of the file from a unique identifier for the file, which the system can use to disseminate an interest for the file. In some other embodiments, the system can generate the checksum to advertise the presence of content item 406 in a local repository to other network nodes. To compute the checksum from the file, the system can access the file using HSVLI 402 (e.g., to obtain "File(/a/b/c)"), and computes cksum(File(/a/b/c)). The system generates name element 410.4 by generating the address portion to include the computed checksum, and by generating the set of flags to have the termination flag enabled given that the checksum uniquely identifies content item 406.

The system can generate checksum-based name element 410.4 to perform data de-duplication. For example, a user's office computer can include a picture on a work-related namespace (e.g., "/parc/solis/picture.jpg"), and the user's home computer can include the same picture on a personal namespace (e.g., "/solisfamily/pictures/nacho.jpg"). If these computers generate an ordered-element name that includes name element 410.4, both of these computers can satisfy an interest for the picture based on the checksum, even though the HSVLIs for the two picture instances do not have matching HSVLI components.

In some embodiments, the system can also derive one or more fixed-length addresses from a set of content tags 408. Content tags 408 can include tags that include metadata of content item 406, such as keywords found in content item 406 or related to content item 406, authentication data, a creation date, a content owner, etc. The system can generate various combinations of content tags 408, and can sort these combinations from most specific to most general (e.g., based on the number of tags in a combination, and other values such as a weight indicating a significance or uniqueness of a given tag).

The system then generates a set of name elements for the tag combinations (e.g., name elements 410.5, 410.6, and 410.7), and arranges them based on the ordering determined for the tag combinations. The system can generate a fixed-length address for a name element (e.g., name element 410.6) by processing the corresponding tags using a predetermined function (e.g., using a hash function h( ) to compute h("PARC", "Solis", "2013")). In some embodiments, because the name elements derived from the content tags may not uniquely identify a content item, the system sets the corresponding termination flags to "0." However, if the system generates a tag combination that includes a content tag that uniquely identifies content item 406 (e.g., a checksum value, or any other unique identifier for content item 406), the system can set the corresponding termination flag to "1."

In some embodiments, the system can generate an interest for content item 406 by appending the p individual n-bit fixed-length elements, based on their determined ordering, to form a p*n-bit ordered-element name.

In some embodiments, if the system is advertising content item 406 to other neighboring nodes of a computer network, the system can communicate one or more of the individual n-k bit fixed-length addresses to the neighboring nodes without having to communicate their corresponding flags 414 or the complete ordered-element name. The neighboring nodes can insert the fixed-length addresses for content item 406 in their local forwarding information base (FIB) in any order, and in association with their network interface to the local computing device. The neighboring node can include a router, which can perform an exact-match lookup for the ordered elements of an interest, using the FIB, to determining forwarding information for the interest.

FIG. 4B illustrates exemplary ordered-element name 430 that includes fixed-length elements in accordance with an embodiment. Ordered-element name 430 can include name elements 432, 432.2, and 432.3 that are derived from an HSVLI, can include a name element 432.4 that includes a checksum for a content item, and can include a set of name elements that are derived from content tags for a piece of content (e.g., name element 432.p).

In some embodiments, the system can generate an ordered-element name to include both fixed-length elements, as well as HSVLI components that facilitate determining forwarding information at routing nodes that are not capable of processing the fixed-length elements.

In some embodiments, the ordered-element name can include metadata associated with the content item. The metadata can include author-related information that identifies an entity which generated the content item, and/or authentication information that authenticates the entity which generated the content item. The metadata can also include encryption information that indicates an encryption technique used to encrypt the content item, a version identifier for the content item, and/or a format identifier for the content item.

The ordered-element name can also include a set of attribute fields indicating attributes used to generate the ordered-element name. The set of attribute fields can indicate context information associated with the content item, a filename for the content item, metadata associated with the content item, and a hierarchically structured variable-length identifier (HSVLI) for the content item. The contextual information can include a timestamp, a group of data to which the content item belongs, an entity associated with an interest packet for the content item, an entity which stores the content item, and an entity which generates the content item.

FIG. 4C illustrates exemplary ordered-element name that includes fixed-length elements 460 and HSVLI components in accordance with an embodiment. Ordered-element name 460 can include name elements 462.2 and 462.3 that include prefixes from an HSVLI, and can include name elements derived from an HSVLI (e.g., name element 462.1), from a checksum for a content item (e.g., name element 462.4), and from content tags for a piece of content (e.g., name element 462.p).

Network Forwarder System for Processing an Interest

In some embodiments, a network forwarder system (e.g., a router) can route data and interest packets by performing an exact-match lookup operation against one or more fixed-length elements of the ordered-element name for a piece of content. The system can provide a cache, forwarding information base (e.g., forwarding tables), pending-interest tables, etc.

Figure 5A:
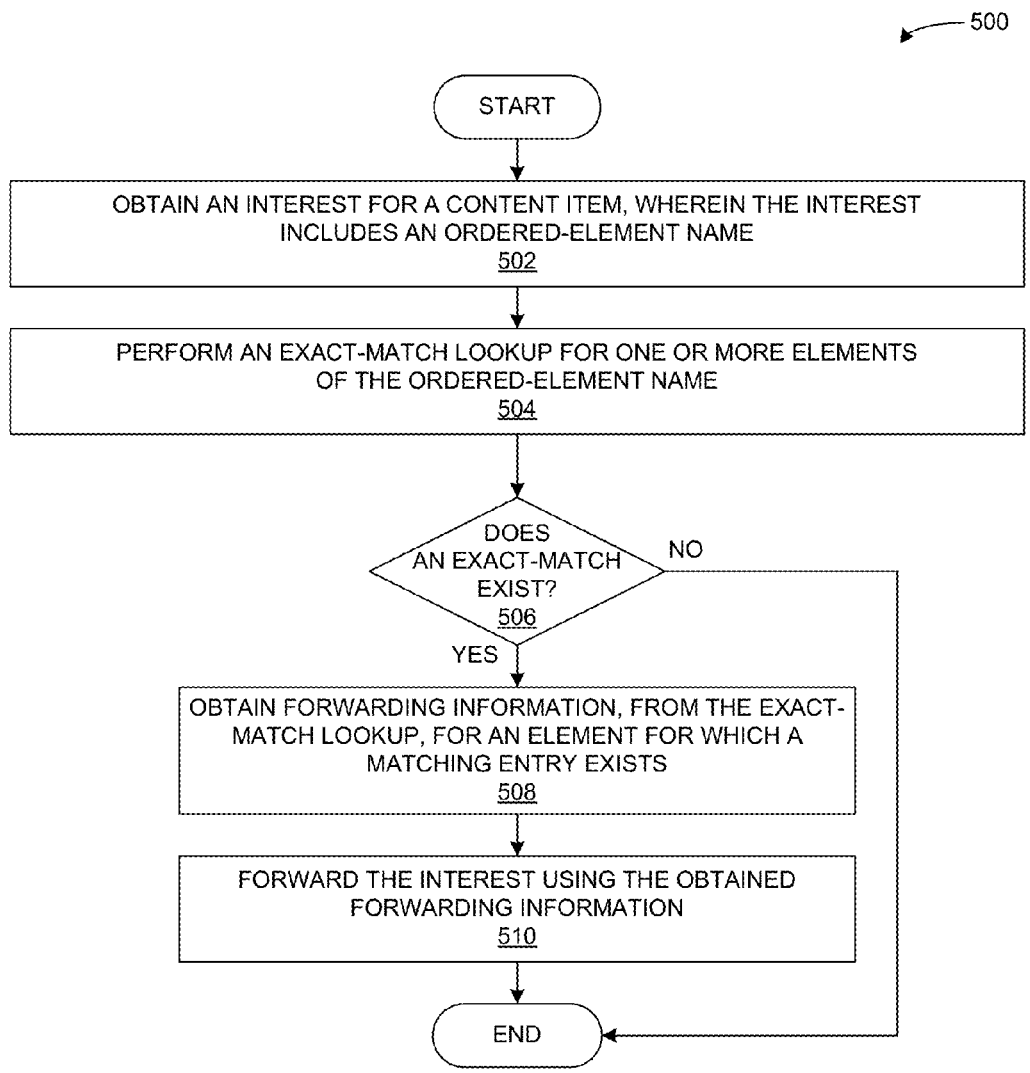
FIG. 5A presents a flow chart illustrating a method for forwarding an interest based on an ordered-element name in accordance with an embodiment.

FIG. 5A presents a flow chart illustrating a method for forwarding an interest based on an ordered-element name in accordance with an embodiment. During operation, the system obtains an interest that includes an ordered-element name for a content item (operation 502). The system performs an exact-match lookup for one or more elements of the ordered-element name (operation 504), and determines whether an exact-match exists (operation 506). The system can process the individual elements in parallel, in a sequence, or in a combination of the two.

If the system determines that an exact-match exists for an element, the system obtains forwarding information for this element from the exact-match lookup (operation 508). The system then forwards the interest using the obtained forwarding information (operation 510).

In some embodiments, if the system determines at operation 506 that an exact-match does not exist, the system can perform a remedial action. For example, the system can store the interest in a pending interest table (PIT), which maps the various fixed-length element of the interest to the interest. Then, when the content item becomes available (e.g., in response to receiving the content item from a remote computing device), the system can remove the interest from the PIT. As another example, the system can ignore the interest to allow another network node to respond.

In some embodiments, a network device can include a content repository, which stores content items that can be accessed using a matching interest. The network device can include a router or firewall with a content cache, a personal computing device, a content server, or a server within a computer cluster. When the network device receives an interest, the network device can perform an exact-match lookup in the content repository for elements of the ordered-element name that have a termination flag enabled. If the content item is stored locally, the network device can return the content item from the local content repository, without having to perform an exact-match lookup for other elements of the ordered-element name.

Figure 5B:
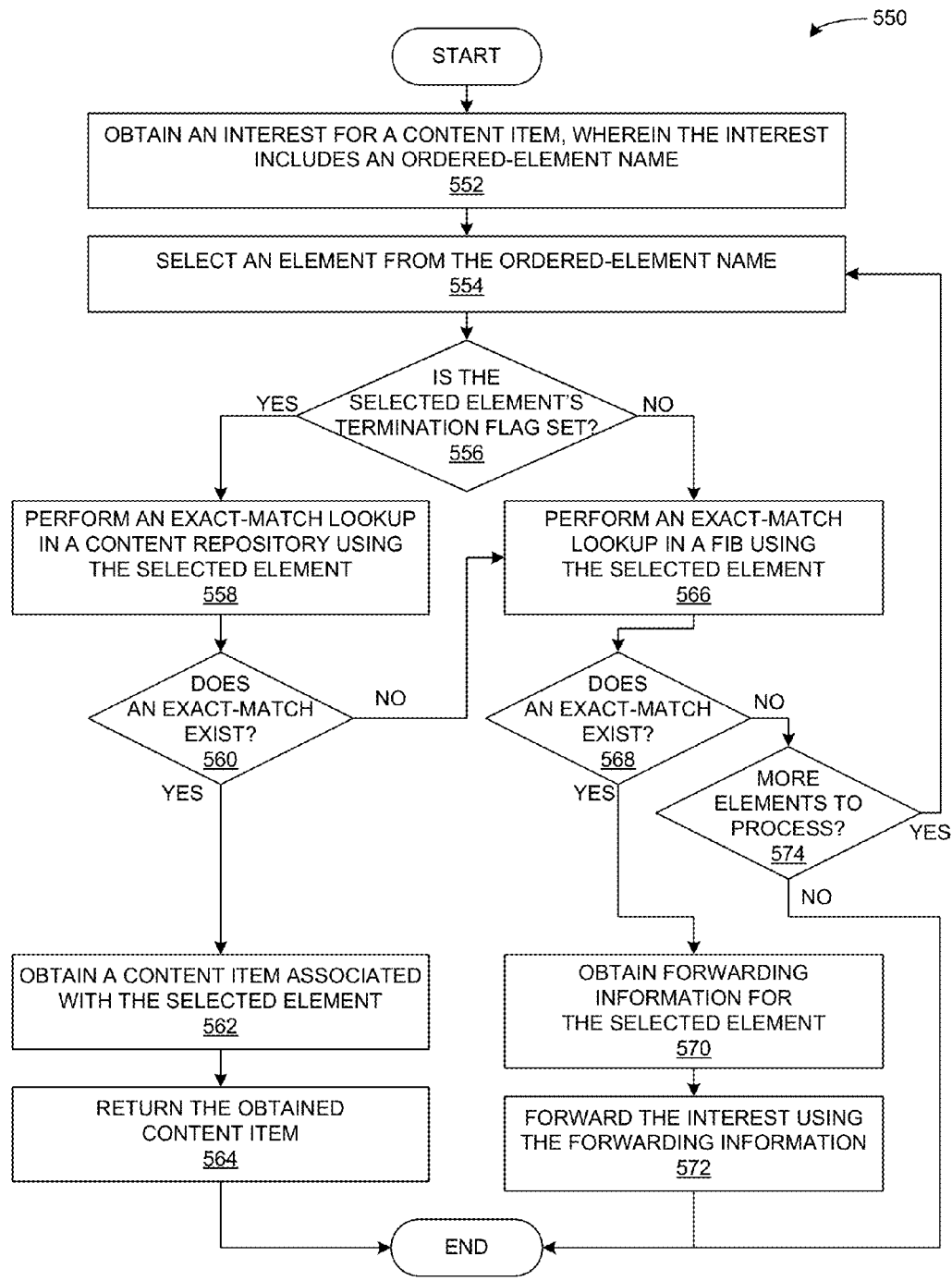
FIG. 5B presents a flow chart illustrating a method for forwarding an interest based on an ordered-element name with termination flags in accordance with an embodiment.

FIG. 5B presents a flow chart illustrating a method for forwarding an interest based on an ordered-element name with termination flags in accordance with an embodiment. During operation, the system can obtain an interest that indicates an ordered-element name for a content item (operation 552). The system can process the individual elements in parallel, in a sequence, or in a combination of the two. For example, the system can select an element from the ordered-element name (operation 554), and performs an exact-match lookup using the selected element. Recall that the ordered-element name includes a set of elements that are ordered based on their priority. Hence, during operation 554, the system can select the element based on the explicit ordering.

To perform the exact-match lookup, the system determines whether the selected element's termination flag is set (operation 556). If so, the system performs an exact-match lookup operation in a content repository using the selected element (operation 558), and determines whether an exact match exists (operation 560). If an exact match exists, the system does not need to consider other elements of the ordered-element name, at which point the system obtains a content item associated with the selected element (operation 562), and returns the obtained content item to the network node from which the system received the interest (operation 564).

If the system determines at operation 556 that the selected element's termination flag is not set, or determines during operation 560 that an exact match does not exist in the content repository for the selected element, the system can proceed to process the element in accordance to the flags and priorities of the other elements. For example, the system may first determine whether there is an exact-match in the content repository for other lower-priority elements that have the termination flag set, and proceeds to process the selected element otherwise (not shown).

To process the selected element, the system can perform an exact-match lookup in a forwarding information base (FIB) using the selected element (operation 566), and determines whether an exact match exists (operation 568). If an exact match exists, the system obtains forwarding information for the element from the FIB (operation 570), and forwards the interest using the forwarding information (operation 572).

Recall that the system can process the fixed-length elements in parallel, or in a sequence. In some embodiments, the system may utilize a hardware-based exact-match lookup mechanism that can process up to n elements in parallel. Hence, the system may need to process some elements in a sequence when the ordered-element name includes more than n elements. During operation 568, if an exact-match does not exist for the selected element (or for any of the n elements processed in parallel), the system proceeds to determine whether there are more elements to process (operation 574).

If other elements remain to be processed, the system can return to operation 554 to select another element from the ordered-element name. If no more elements remain, the system has determined that an exact-match does not exist for the ordered-element name, and can perform a remedial action, such as to add the interest to the PIT, to ignore the interest, or to send a response message to the network node from which it received the interest.

In some embodiments, the system can receive a data packet that includes a content item that satisfies an interest stored in the local PIT. The data packet can include one or more fixed-length elements (e.g., the content item's ordered-element name), and the system searches the PIT using these fixed-length elements to determine whether a pending interest exists for the content item. If a pending interest does exist for the content item, the system determines a target entity for the content item, and forwards the data packet to the target entity. The system can search the PIT by performing an exact-match lookup through the PIT to identify an interest whose ordered-element name includes a fixed-length element that matches a fixed-length element of the data packet's ordered-element name. Also, in some embodiments, if the interest includes a set of termination flags for the fixed-length elements, the content item satisfies the interest if the interest has a termination flag set for the matching fixed-length element.

Figure 6:
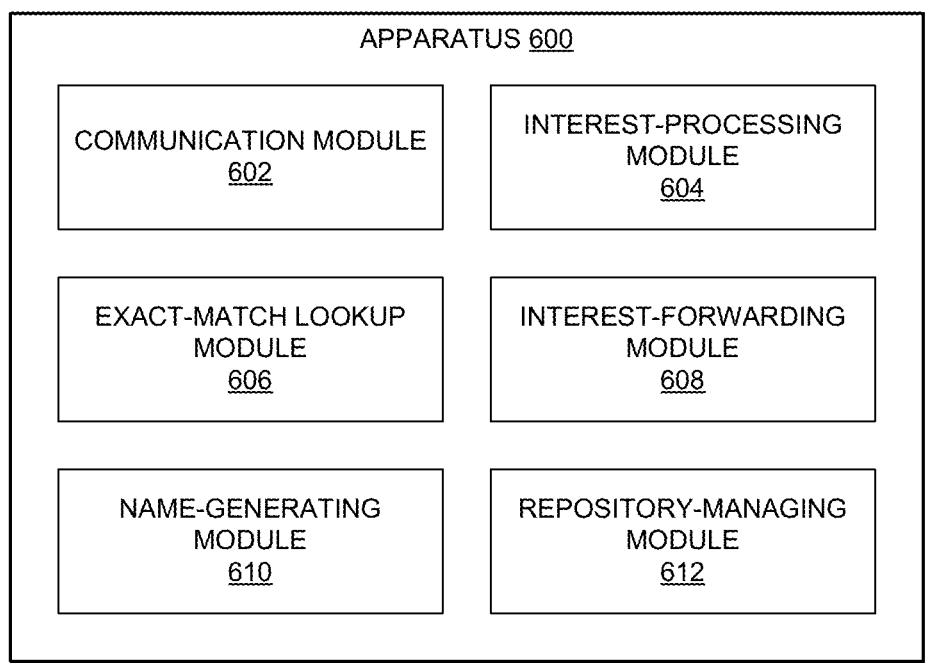
FIG. 6 illustrates an exemplary apparatus that facilitates obtaining a content item based on an ordered-element name for the content item in accordance with an embodiment.

FIG. 6 illustrates an exemplary apparatus 600 that facilitates obtaining a content item based on an ordered-element name for the content item in accordance with an embodiment. Apparatus 600 can comprise a plurality of modules which may communicate with one another via a wired or wireless communication channel. Apparatus 600 may be realized using one or more integrated circuits, and may include fewer or more modules than those shown in FIG. 6. Further, apparatus 600 may be integrated in a computer system, or realized as a separate device which is capable of communicating with other computer systems and/or devices. Specifically, apparatus 600 can comprise a communication module 602, an interest-processing module 604, an exact-match lookup module 606, an interest-forwarding module 608, a name-generating module 610, and a repository-managing module 612.

In some embodiments, communication module 602 can send and/or receive packets over a computer network, such as packets that include a content item or an interest for a content item. Interest-processing module 604 can determine forwarding information for the interest using an exact-match lookup for one or more of the fixed-length elements. Exact-match lookup module 606 can search, in a forwarding information base (FIB), for an exact match to a fixed-length element of the interest to obtain forwarding information. Interest-forwarding module 608 can select forwarding information for at least one fixed-length element for which an exact match is found.

Name-generating module 610 can convert a structured name into an ordered-element name, so that the ordered-element name includes fixed-length elements ordered from a highest-priority to a lowest-priority. Repository-managing module 612 can generate a repository-synchronization message for the content item, which indicates one or more of the fixed-length elements, and sends the repository-synchronization message to one or more neighboring nodes of a computer network to advertise the presence of the content item.

Figure 7:
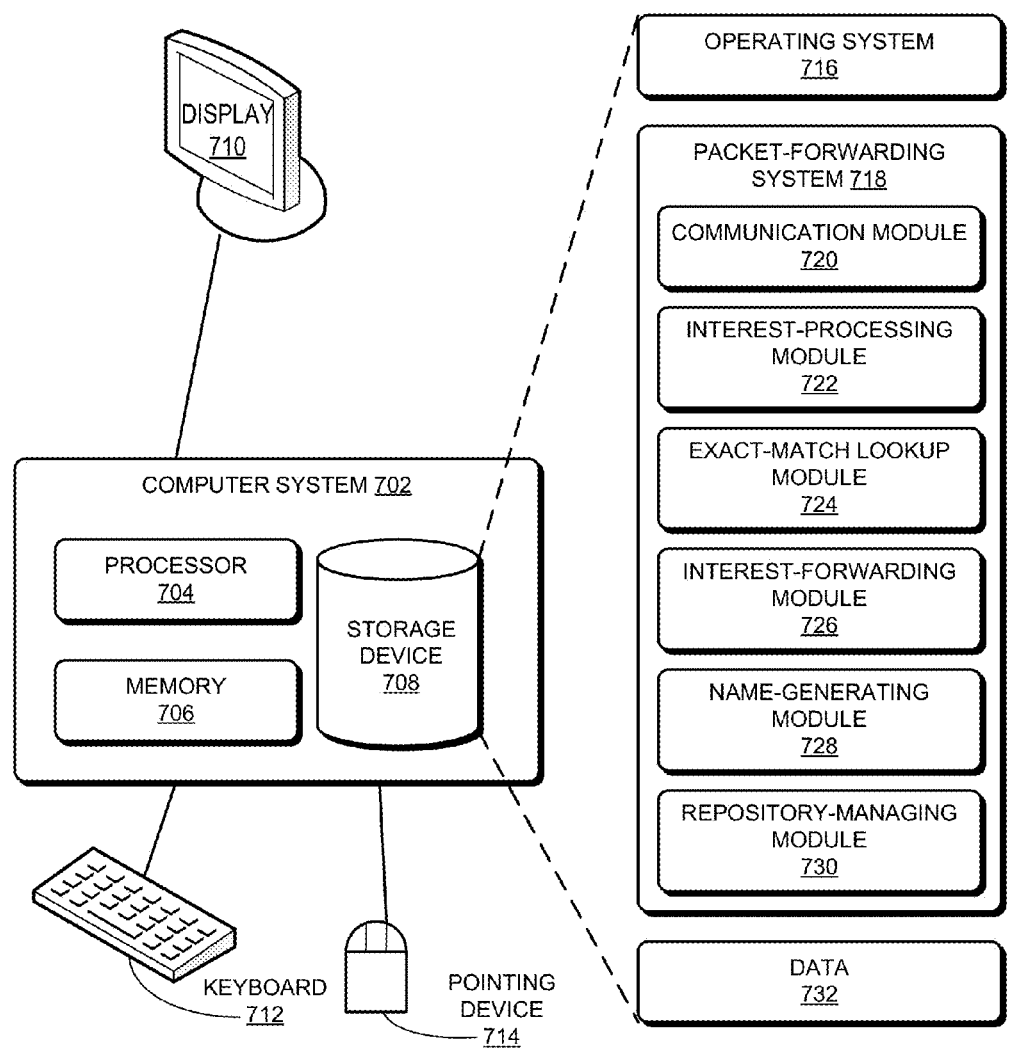
FIG. 7 illustrates an exemplary computer system that facilitates obtaining a content item based on an ordered-element name for the content item in accordance with an embodiment.

FIG. 7 illustrates an exemplary computer system 702 that facilitates obtaining a content item based on an ordered-element name for the content item in accordance with an embodiment. Computer system 702 includes a processor 704, a memory 706, and a storage device 708. Memory 706 can include a volatile memory (e.g., RAM) that serves as a managed memory, and can be used to store one or more memory pools. Furthermore, computer system 702 can be coupled to a display device 710, a keyboard 712, and a pointing device 714. Storage device 708 can store operating system 716, packet-forwarding system 718, and data 726.

Packet-forwarding system 718 can include instructions, which when executed by computer system 702, can cause computer system 702 to perform methods and/or processes described in this disclosure. Specifically, packet-forwarding system 718 may include instructions for sending and/or receiving packets over a computer network, such as packets that include a content item or an interest for a content item (communication module 720). Further, packet-forwarding system 718 can include instructions for determining forwarding information for the interest using an exact-match lookup for one or more of the fixed-length elements (interest-processing module 722).

Packet-forwarding system 718 can include instructions for searching, in a forwarding information base (FIB), for an exact match to a fixed-length element of the interest to obtain forwarding information (exact-match lookup module 724). Packet-forwarding system 718 can also include instructions for selecting forwarding information for at least one fixed-length element for which an exact match is found (interest-forwarding module 726).

Packet-forwarding system 718 can include instructions for converting a structured name into an ordered-element name, so that the ordered-element name includes fixed-length elements ordered from a highest-priority to a lowest-priority (name-generating module 728). Packet-forwarding system 718 can also include instructions for generating a repository-synchronization message for the content item, which indicates one or more of the fixed-length elements, and sending the repository-synchronization message to one or more neighboring nodes of a computer network to advertise the presence of the content item (repository-managing module 730).

Data 726 can include any data that is required as input or that is generated as output by the methods and/or processes described in this disclosure. Specifically, data 726 can store at least a content repository and/or a forwarding information base.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
    obtaining, by a computing device of a content-centric network, name-generating information associated with a content item or a context of the content item;
    generating, by the computing device for the content item, two or more fixed-length elements that each is mapped to the content item or to a context associated with the content item, wherein generating a respective fixed-length element involves:
        selecting at least a subset of the name-generating information; and
        generating the respective fixed-length element based on the selected subset of the name-generating information;
    determining an ordering for the two or more fixed-length elements from a highest-matching priority to a lowest-matching priority;
    generating an ordered-element name that includes the two or more ordered fixed-length elements in the determined ordering;
    generating a packet that includes the ordered-element name for the content item;
    determining a target interface for the packet, which involves performing an exact-match lookup in a lookup table based on any fixed-length element of the ordered-element name, and selecting an interface associated with a matching fixed-length element with a highest-matching priority; and
    sending the packet to a local application or to a network neighbor via the target interface.

2. The method of claim 1, wherein determining the ordering involves:
    determining a matching priority for a respective fixed-length element, wherein a matching priority for a respective fixed-length element is based on the corresponding name-generating information; and
    determining the ordering, for the one or more fixed-length elements, from a highest matching priority to a lowest matching priority.

3. The method of claim 1, wherein the name-generating information includes one or more of:
    an ordered-element name associated with the content item;
    hierarchically structured variable-length identifier (HS-VLI) associated with the content item;
    a filename associated with the content item;
    structured information for the content item;
    a universal resource identifier (URI) for the content item;
    domain name system (DNS) information associated with the content item;
    a timestamp associated with the content item;
    a location associated with the content item;
    an entity associated with the content item;
    a portion of the content item;
    data included in the content item;
    information related to a content producer;
    information related to a content creator;
    information related to a content publisher;
    information related to a content owner;
    information related to a content requester;
    information related to a content-consuming device;
    information related to a user;
    information related to a local physical environment;
    information related to a runtime environment;
    a keyword associated with content of the content item;
    a keyword for a category associated with the content item;
    a keyword for an organization associated with the content item;
    a randomly generated number; and
    information obtained from a user.

4. The method of claim 1, wherein generating the respective fixed-length element involves one or more of:
    deriving a fixed-length element using a predetermined function that takes as input the name-generating information for the content item;
    deriving a fixed-length element using a predetermined function that takes as input the content item;

determining a fixed-length element based on other fixed-length elements;
determining a fixed-length element from other ordered-element names;
determining a fixed-length element from previous network events;
determining a fixed-length element by querying the network using the name-generating information as input;
computing a hash using the name-generating information for the content item as input; and
computing a hash using the content item as input.

5. The method of claim 1, wherein the ordered-element name further includes one or more of:
a content type;
content author information;
name-generator information;
a termination flag for a corresponding fixed-length element, which indicates that an exact-match lookup for the corresponding fixed-length element satisfies an exact-match lookup for the content item;
a non-terminal flag for a corresponding fixed-length element, which indicates that an exact-match lookup for the corresponding fixed-length element identifies routing information for the content item, but does not satisfy an exact-match lookup for the content item;
an exclude flag for a corresponding fixed-length element, which indicates that the ordered-element name does not satisfy a match when an exact-match is identified for the corresponding fixed-length element;
network status information;
an error code;
an application-defined data field;
time information;
security information;
version information;
format information;
a parameter for performing an exact-match lookup operation; and
a name-generating information item, which was used to generate the ordered-element name.

6. The method of claim 1, wherein generating the respective fixed-length element involves computing a fixed-length address from one or more elements included in an identifier, a filename, or metadata of the content item.

7. A computer-implemented method, comprising:
generating, by a computing device of a content-centric network, an ordered-element name for a content item, wherein the ordered-element name includes two or more fixed-length elements ordered from a highest priority to a lowest priority, wherein a respective fixed-length element is mapped to the content item or to a context associated with the content item, and wherein generating the respective fixed-length element involves:
 selecting at least a subset of the name-generating information; and
 generating the respective fixed-length element based on the selected subset of the name-generating information;
generating a packet that includes the ordered-element name for the content item, wherein the ordered-element name facilitates forwarding the packet based on an exact-match lookup on one or more of the fixed-length elements;
determining a packet type for the packet;
determining a target location for the packet, which involves performing an exact-match lookup in a lookup table based on any fixed-length element of the ordered-element name, and selecting a location associated with a matching fixed-length element with a highest-matching priority;
sending the packet to the determined target location.

8. The method of claim 7, wherein the target location includes one or more of:
a data repository within the local computing device;
an application executed by the local computing device;
a remote computing device; and
an application executed by the remote computing device.

9. The method of claim 7, wherein the packet type includes at least one of:
a data packet;
an interest packet; and
a control packet.

10. The method of claim 7, further comprising:
maintaining a first data repository, which maps a fixed-length element to an interest packet and/or to one or more remote devices, to determine when a corresponding packet needs to be sent to a remote device; and
maintaining a second repository, which maps a respective packet to one or more remote devices, to keep track of when a packet has been sent to a remote device.

11. The method of claim 7, further comprising:
determining network-address information for the computing device; and
generating the packet to include the network-address information.

12. A computer-implemented method, comprising:
receiving, by a computing device of a content-centric network, a packet which includes an ordered-element name for a content item, wherein the ordered-element name includes two or more fixed-length elements ordered from a highest priority to a lowest priority, and wherein a respective fixed-length element is mapped to the content item or to a context associated with the content item;
determining a packet type for the received packet;
performing an exact-match lookup operation in a lookup table, based on the packet type and using the ordered-element name's fixed-length elements as input, to determine a packet-processing operation for the packet that corresponds to a matching fixed-length element with a highest priority of the packet's ordered-element name; and
performing the packet-processing operation to process the received packet.

13. The method of claim 12, wherein the packet type includes at least one of:
a data packet;
an interest packet; and
a control packet.

14. The method of claim 12, wherein determining the packet-processing operation involves:
determining a target packet-processing operation corresponding to the packet type; and
performing a target-device-lookup operation, based on the packet type, to identify a target computing device that is to perform the target packet-processing operation.

15. The method of claim 14, wherein performing the target-device-lookup operation involves one or more of:
performing an exact-match lookup operation based on the packet type;
performing an exact-match lookup operation based on the ordered-element name;

performing a wildcard-lookup operation based on the packet type; and performing a wildcard-lookup operation based on the ordered-element name.

16. The method of claim 14, wherein the target computing device is a remote computing device; and wherein the packet-processing operation involves forwarding the packet to the remote computing device.

17. The method of claim 16, further comprising storing the packet in a data structure which maps a respective fixed-length element of the packet to the packet.

18. The method of claim 14, wherein the target computing device is the local computing device; and wherein performing the packet-processing operation involves:

obtaining, from a local repository, a stored packet corresponding to the ordered-element name; and sending the stored packet to a remote computing device from which the local computing device received the original packet.

19. The method of claim 14, wherein the target computing device is the local computing device; and wherein performing the packet-processing operation involves:

generating a packet based on information from the received packet; and sending the generated packet to a remote computing device from which the local computing device received the original packet.

20. The method of claim 19, wherein generating the packet involves:

determining data-generating parameters based on one or more of:

a fixed-length element of the original packet's ordered-element name;

an attribute indicated by the ordered-element name;

metadata indicated by the original packet or the ordered-element name; and a data object stored in the original packet; and generating the response packet based on the determined data-generating parameters.

21. The method of claim 14, wherein the target computing device is the local computing device; and wherein performing the packet-processing operation involves providing the packet to an application executing on the computing device to determine an application-specific operation for processing the packet.

22. A computer-implemented method, comprising:

detecting, by a computing device of a content-centric network, a content item to advertise to other computing devices;

obtaining name-generating information associated with the content item or a context of the content item;

generating, by the computing device for the content item, two or more fixed-length elements that each is mapped to the content item or to the context associated with the content item, wherein generating a respective fixed-length element involves:

selecting at least a subset of the name-generating information; and generating the respective fixed-length element based on the selected subset of the name-generating information;

generating an advertisement for the content item, wherein the advertisement indicates the two or more fixed-length elements to advertise the presence of the content item; and sending the advertisement to a neighboring node of the content-centric network, which allows the neighboring node to use any of the two or more fixed-length elements to forward an interest associated with the content item to the local computing device via the content-centric network.

23. The method of claim 22, wherein the content item includes one or more of:

a content item stored within a local repository of the local computing device;

a content item which is to be generated by the local computing device; and a content item which is hosted by a remote computing device.

* * * * *